United States Patent [19]

Isfeld et al.

[11] Patent Number: 5,459,840
[45] Date of Patent: Oct. 17, 1995

[54] INPUT/OUTPUT BUS ARCHITECTURE WITH PARALLEL ARBITRATION

[75] Inventors: Mark S. Isfeld, San Jose; Michael H. Bowman, Palo Alto; Niles E. Strohl, Tracy, all of Calif.

[73] Assignee: 3Com Corporation, Santa Clara, Calif.

[21] Appl. No.: 23,008

[22] Filed: Feb. 26, 1993

[51] Int. Cl.[6] .................................................. G06F 13/14
[52] U.S. Cl. .......................... 395/309; 395/299; 395/730
[58] Field of Search ................................... 395/325, 275, 395/725, 425

[56] References Cited

U.S. PATENT DOCUMENTS

| | | | |
|---|---|---|---|
| 4,451,881 | 5/1984 | Grice et al. ................................ | 395/325 |
| 4,488,217 | 12/1984 | Binder et al. . | |
| 4,620,278 | 10/1986 | Ellsworth et al. ......................... | 395/325 |
| 4,827,409 | 5/1989 | Dickson . | |
| 4,837,767 | 6/1989 | Hartwell et al. . | |
| 4,858,234 | 8/1989 | Hartwell et al. . | |
| 4,864,496 | 9/1989 | Triolo et al. . | |
| 4,897,779 | 1/1990 | Dickson et al. . | |
| 4,933,845 | 6/1990 | Hayes . | |
| 4,979,097 | 12/1990 | Triolo et al. . | |
| 5,020,020 | 5/1991 | Pomfret et al. . | |
| 5,101,479 | 3/1992 | Baker et al. . | |
| 5,119,292 | 6/1992 | Baker et al. . | |
| 5,148,545 | 9/1992 | Herbst et al. . | |
| 5,150,467 | 9/1992 | Hayes et al. . | |
| 5,179,705 | 1/1993 | Kent ......................................... | 395/725 |
| 5,199,106 | 3/1993 | Bourke et al. ............................ | 395/275 |
| 5,263,163 | 11/1993 | Holt et al. ................................ | 395/725 |
| 5,307,466 | 4/1994 | Chang ..................................... | 395/325 |
| 5,388,232 | 2/1995 | Sullivan et al. .......................... | 395/325 |

OTHER PUBLICATIONS

Andrews, "Mezzanine buses struggle with standards", Computer Design, Jul. 1991, pp. 81–82, 84 and 86–88.
Lieberman, "Variety of enhancements revitalize 16–bit buses", Computer Design, Jul. 1988, pp. 41–42 and 44–45.
Lyle, "A Ride on the SBus", Byte, May 1992, pp. 283–287.
Meade, "The Battle over BI", DEC Professional, Dec. 1988, pp. 48 and 50–52.
Wilson, "BI Bus Boosts Performance of VAX Systems", Digital Design, Mar. 1986, pp. 46, 48, 50 and 52.

Primary Examiner—Jack B. Harvey
Assistant Examiner—Glenn A. Auve
Attorney, Agent, or Firm—Haynes & Davis

[57] ABSTRACT

A high performance bus suitable for high speed internetworking applications which is based on three bus phase types, including an arbitration phase, an address phase, and a data phase. The arbitration, address, and data phases share a single set of lines. Distributed arbitration logic on each of the interface devices supplies local arbitration codes to a particular line in the set of lines in the arbitration cycle, and detects an arbitration win during the same phase in response to the local arbitration code, and other arbitration codes driven on the set of lines during the arbitration cycle. Each module coupled to the bus also assigned a local priority code. During the arbitration cycle, both the arbitration code and the priority code are driven on respective subsets of the shared sets of lines. Assertion of the local priority code overrides normal requests for the bus. The arbitration logic on each module includes a bus request logic which has the effect of defining arbitration cycles, such that in a particular arbitration phase, a group of modules that asserts a bus request signal controls the bus request signal until all modules in the group have won arbitration.

25 Claims, 14 Drawing Sheets

INPUT/OUTPUT BUS ARCHITECTURE WITH PARALLEL ARBITRATION

BACKGROUND OF THE INVENTION

1. Field of the Invention

The present invention relates to high speed input/output buses, and more particularly to high performance buses optimized for internetworking applications.

2. Description of Related Art

Input/output buses (I/O buses) provide the backbone for communication of data among data processing modules in a data processing system. The bandwidth of the bus is often a determining factor in the performance of the overall system. In large scale communication networks, internetworking devices often couple a plurality of high speed networks to a common controller. The amount of data transferred on the network can be very large. Thus, a very high bandwidth I/O bus is necessary for such systems.

One critical component in the bandwidth of the bus is known as bus latency; that is, the amount of time between a request for access to the bus, and completion of a transfer across the bus. When there are a number of users of the bus, arbitration for access to the bus is often a large component of the latency. Thus, many high speed buses attempt to arbitrate for the bus in parallel with data transfers. For instance, the so-called SBUS promoted by Sun Microsystems, Inc., uses a "radial" bus request/bus grant design for arbitration. In this design, every device on the bus which will seek access to the bus as a bus master, must have a dedicated bus request and bus grant line. Also, each slave on the bus, which is able to receive or respond to requests on the bus, must have a dedicated slave select line. All of these lines are coupled to a centralized controller which performs arbitration in parallel with the address and data transfers occurring for the last arbitration winner. The SBUS suffers the disadvantage, however, of requiring a bus having a large number of lines, which drives up the cost of bus interface devices. The SBUS also requires an independent, high pin count arbiter circuit.

It is desirable to provide a bus having an arbitration mechanism which supports high bandwidth, low latency transfers, and operates with a minimum number of lines on the bus.

SUMMARY OF THE INVENTION

The present invention provides a high performance bus suitable for high speed internetworking applications which is based on three bus phase types, including an arbitration phase, an address phase, and a data phase. The arbitration, address, and data phases share a single set of lines. Thus, during the arbitration phase, the shared set of lines is used for arbitration information, during the address phase, the shared set of lines is used for addresses, and during the data phase, the shared set of lines is used for data.

Distributed arbitration logic on each of interface devices on the bus supplies local arbitration codes to a particular subset of the shared set of lines in the arbitration phase, and detects an arbitration win during the same phase in response to the local arbitration code, and other arbitration codes driven on the shared set of lines during the arbitration phase. The shared set of arbitration, address, and data lines keep the pin count for bus interfaces low. The distributed arbitration logic which operates in a single cycle keeps the bus latency low. Using burst transfers, the bus, according to the present invention, is a very high performance system with a very low cost per node.

Furthermore, distributed arbitration logic includes a register which is accessible through the bus, for storing an arbitration identifier indicating the subset of the shared set of lines for the local arbitration signal. Thus, each data processing module on the bus may be assigned a unique line in the set of lines which it drives to a first state when it desires the bus, and drives to a second state when it does not desire the bus. Only one line in the shared set of lines is driven by any given data processing module. All other lines in the shared set of lines are tristated by the local arbitration logic, so that other modules on the bus may drive their respective arbitration codes.

Further, an arbitration mask register, accessible through the bus, masks the unassigned lines in the shared set of lines so that only lines which have been assigned to a module are sampled by the arbitration logic. The arbitration identifier and arbitration mask can be written by any device coupled to the bus, but are preferably written by a host processing system for ease of management.

According to another aspect of the invention, each module coupled to the bus is assigned both a local arbitration code and a local priority code. During the arbitration phase, both the arbitration code and the priority code may be driven on respective subsets of the shared sets of lines. Assertion of the local priority code is used by the arbitration logic to override normal requests for the bus. The logic arbitrates between first those devices which assert the priority code during a given phase, and then those devices which assert the arbitration code. Thus, for example, in a 32 bit wide data bus, 16 of the data lines are shared for the arbitration codes, with one line per device, and 16 of the data lines are shared for the priority codes with one line per device. The arbitration identifier and arbitration mask registers may be used for controlling both the priority and the normal arbitration logic. Alternatively, an independent priority identifier and priority mask may be applied.

The arbitration logic on each module includes bus request logic which samples a bus request line for bus request signals on the bus during bus phases, and supplies a bus request cycle on the bus during a particular arbitration phase if the local data processing module signals a need for the bus, and there is no previously asserted bus request signal on the bus from another module, or if a bus request signal was supplied by the local bus request logic during a preceding arbitration phase, the local data processing module continues to signal a need for the bus and an arbitration win was not detected during the preceding arbitration phase. This has the effect of defining arbitration cycles, such that in a particular arbitration phase, all of the modules that assert a bus request signal at the same time define an arbitration group. This group of modules controls the bus request signal until all modules in the group have won arbitration. After all modules in the group have won arbitration, a new arbitration cycle may begin.

Yet a further aspect of the present invention provides that the arbitration phases includes initial arbitration phases between transfers, and inter-arbitration phases between address and data phases within transfers. In this aspect, the arbitration logic includes lock logic which is coupled to a dedicated lock line on the bus for selectively sampling the lock line if an arbitration win was not detected in a previous arbitration phase and driving the lock line during an inter-arbitration phase if the local data processing module continues to signal a need for the bus, particularly two consecutive uninterrupted cycles on the bus, and an arbitration win for the local module was detected in the preceding arbitration phase. Logic is also included responsive to an asserted lock signal on the bus driven by another module on the bus for disabling arbitration by the local data processing module for the bus during the inter-arbitration cycle. The lock logic has the effect of allowing arbitration for the bus in otherwise unused inter-arbitration phases during a given data transfer, but allowing a given transfer to maintain control of the bus for multiple transfers.

Accordingly, the present invention provides a high bandwidth bus with a low pin count suitable for connection to an integrated circuit with a very low cost per node. Further, the bus supports true burst mode transfers for very high throughput necessary for large volume internetworking applications. In addition, the bus offers a flexible arbitration scheme with very low latency.

Other aspects and advantages of the present invention can be seen upon review of the figures, the detailed description, and the claims which follow.

DESCRIPTION OF THE PREFERRED EMBODIMENTS

Figure 1:
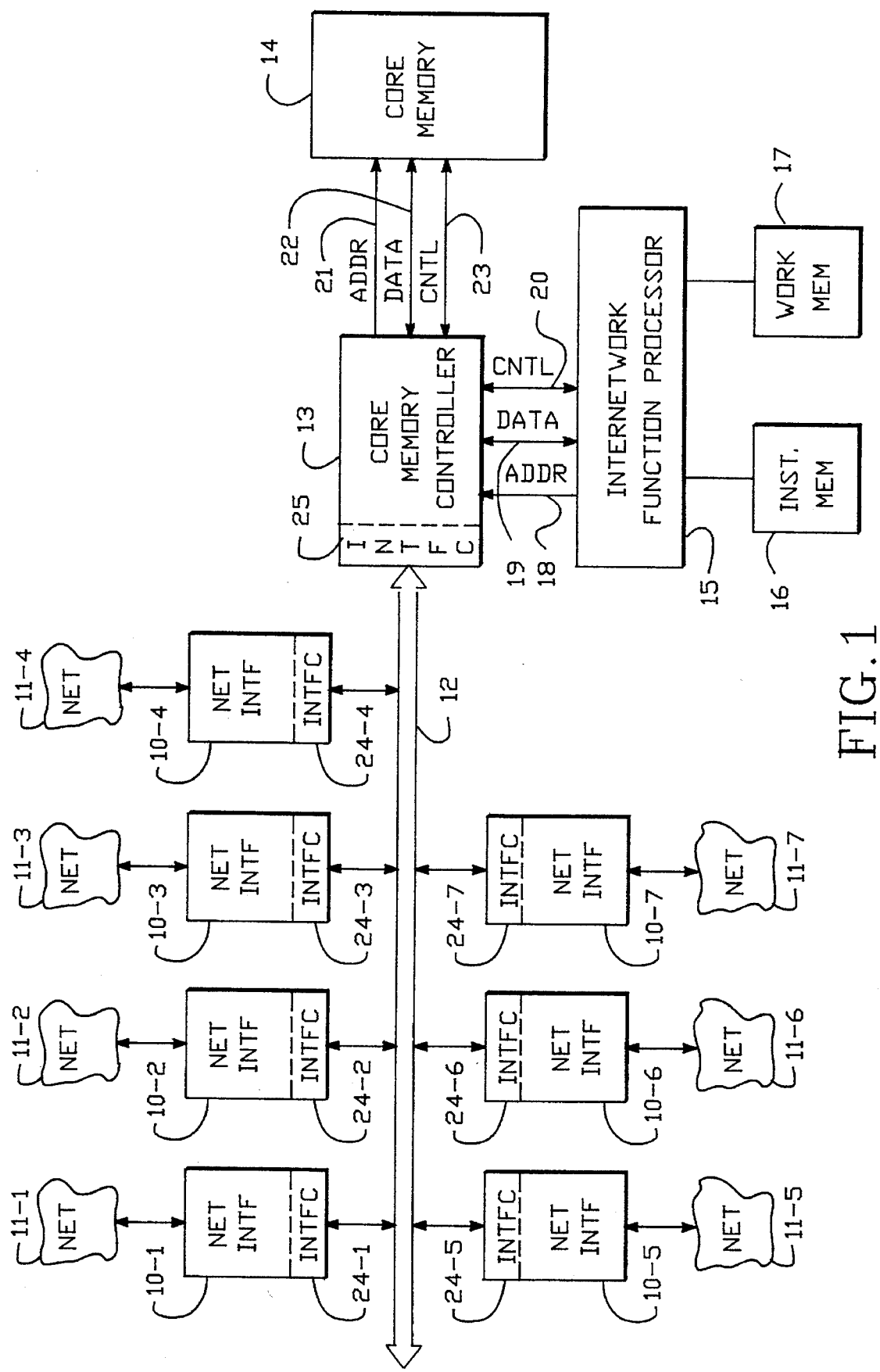
FIG. 1 is a block diagram of an internetworking system using a bus according to the present invention.
Figure 2:
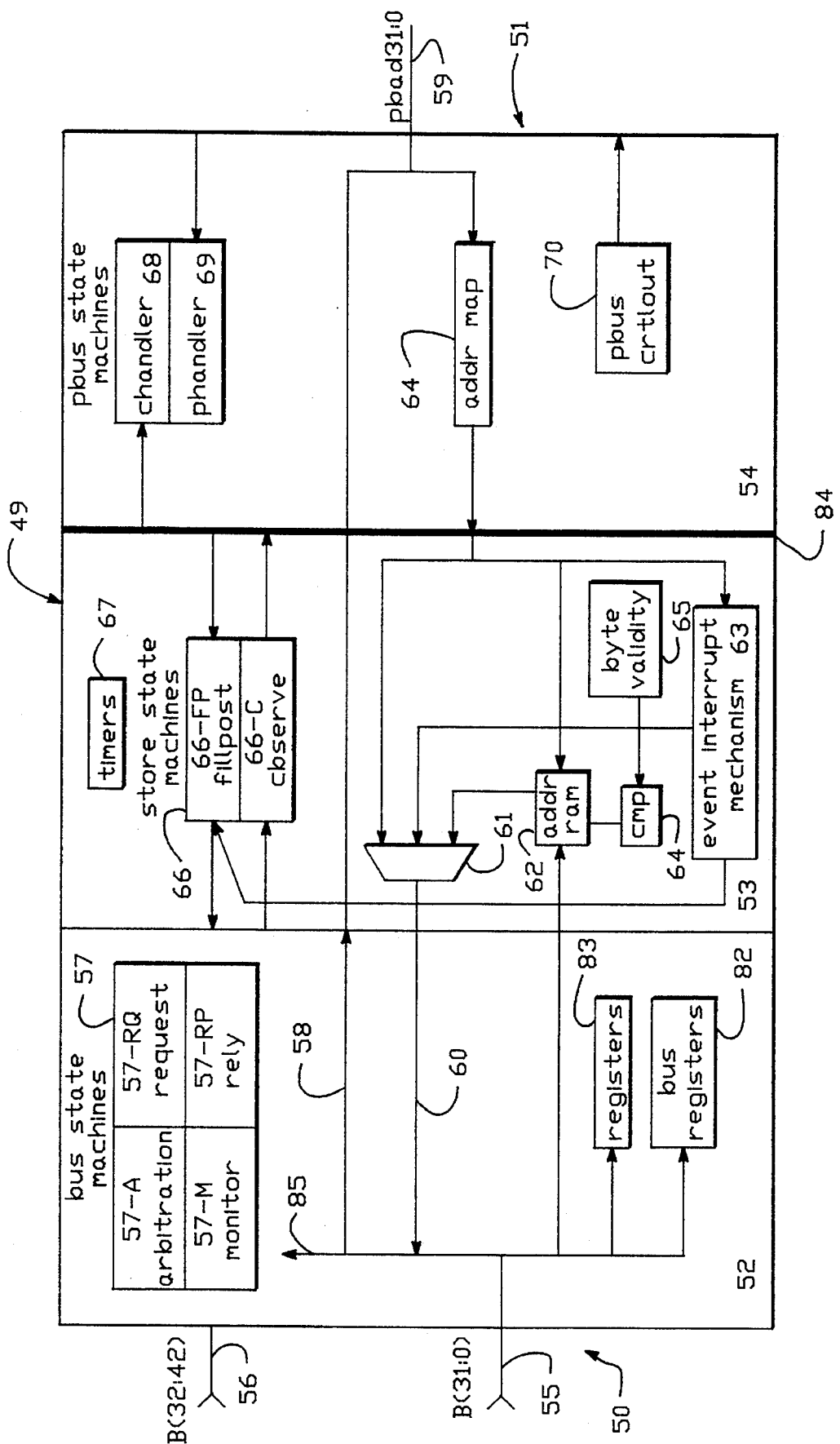
FIG. 2 is a schematic block diagram for address and control paths of an interface device coupled to the bus of FIG. 1.
Figure 3:
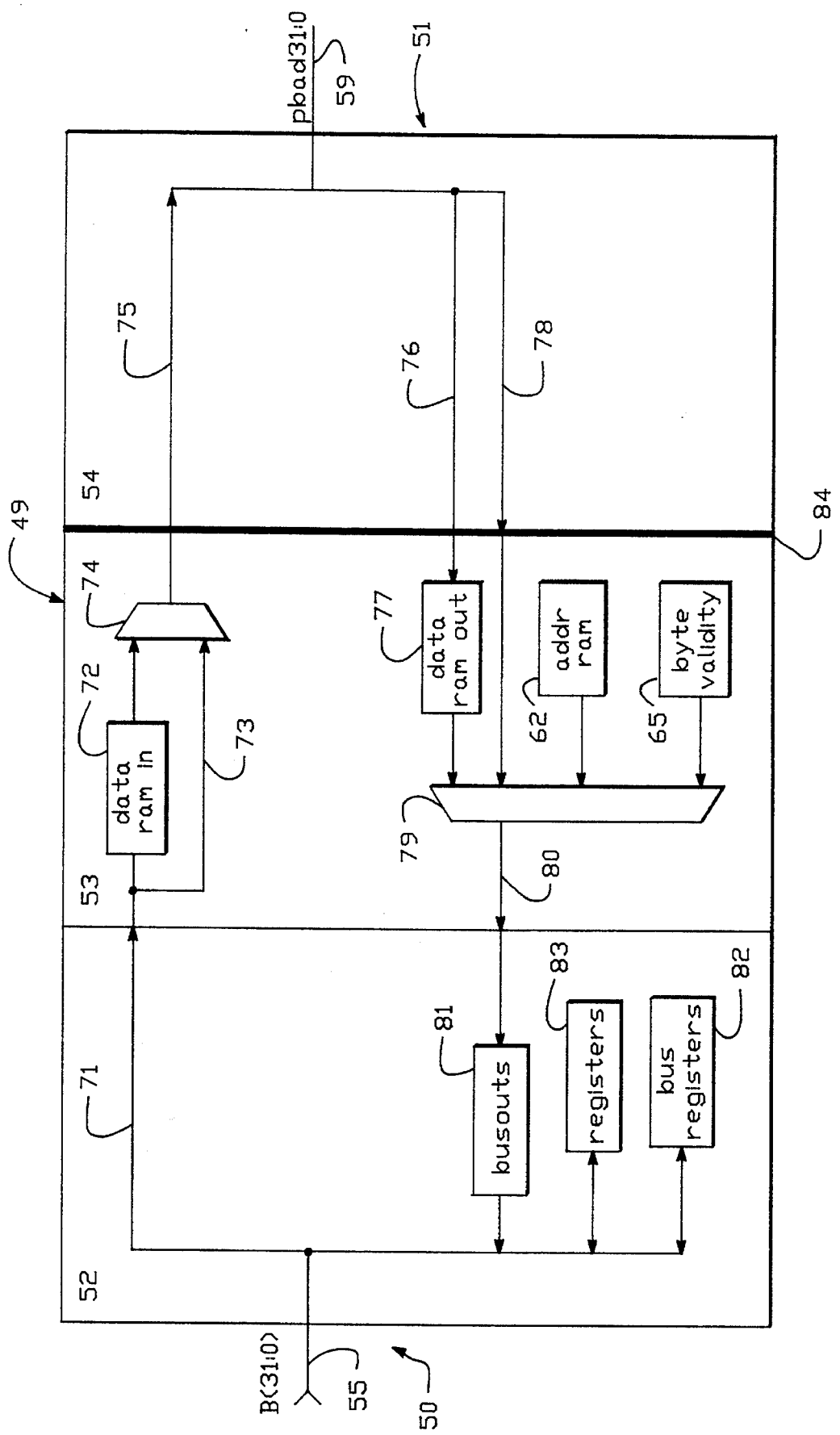
FIG. 3 is a schematic block diagram of the data paths for the interface device of FIG. 2.

A detailed description of preferred embodiments of the present invention is provided with respect to the figures. FIGS. 1–3 illustrate one environment for use of a bus according to the present invention having to do with large scale internetworking products. FIGS. 4–7 provide examples of bus operation. FIGS. 8–15 illustrate a detailed implementation of a bus interface according to the present invention.

I. System Overview (FIGS. 1–3)

FIG. 1 illustrates the architecture of an internetwork system with a bus 12 according to the present invention. The system includes a plurality of network interface devices labelled 10-1 through 10-7, that are coupled to respective networks 11-1 through 11-7. Each of the plurality of network interface devices 10-1 through 10-7 is coupled to I/O bus 12. The bus 12 is also connected to a core memory controller 13 through which access to a core memory 14 is provided. Also coupled to the core memory controller 13 is an internetwork function processor 15 having instruction memory 16 and working memory 17. The internetwork function processor 15 supplies addresses on line 18, data on line 19, and control on line 20 to the core memory controller 13 for the purpose of reading and writing data in the core memory 14, and communicating with the network interface devices 10-1 through 10-7 across the bus 12.

Similarly, the core memory controller 13 is coupled to the core memory 14 across address lines 21, data lines 22, and control lines 23 for accesses by the internetwork function processor 15 and the plurality of network interface devices across the bus 12 to the core memory 14.

Each of the network interface devices coupled to the bus 12 includes a relatively intelligent processor which communicates across the bus 12 with buffers and control structures in the core memory 14, using configuration information in respective configuration stores (not shown). The internetwork function processor 15 is responsible for setting up the configuration information in the configuration stores by communicating across the bus 12.

Each network interface device has specific needs for buffers and control structures in order to carry out the network interface function. All of these buffers and control structures that are needed by the interface devices are kept in the core memory 14. All other data in the system is maintained by the instruction memory 16 and working memory 17 of the internetwork function processor 15.

Using this architecture, the internetwork function processor may perform internetworking routines using the instruction memory 16 and working memory 17 without suffering wait states due to contention with the network I/O transfers into and out of the core memory. Only when the internetworking routine requires control information from the control structures or control fields in the packets of network data, are accesses by the internetwork function processor necessary to the core memory 14.

The I/O bus 12 is served by bus interfaces 24-1 through 24-7 coupled to each of the network interface devices 10-1 through 10-7, and bus interface 25 on the core memory controller 13. The I/O bus 12 provides high bandwidth transfers of packets of data among the devices coupled to the bus. It includes single phase arbitration for efficient detection of arbitration wins for access to the bus. Also, the bus 12 uses shared address and data lines which are also used for the arbitration function. Thus, the bus interfaces 24-1 through 24-7 and 25 have a relatively low pin count, for low cost because cost of ASICs is highly dependent on pin count. Further details concerning the bus are provided below.

FIGS. 2 and 3 provide a schematic diagram of an integrated circuit bus interface (e.g., 24-1) for use in the system of FIG. 1. In FIG. 2, the address and control paths are shown. The device includes an I/O bus connection generally 50, and a peripheral bus connection generally 51. The peripheral bus connection 51 is designed for a particular network interface controller using standard techniques known in the art. For instance, the peripheral bus may be adapted to an ethernet interface controller, an FDDI interface controller, a high speed serial interface controller, a token ring interface controller, or other network interface devices, as suits a particular implementation. Thus, an integrated circuit generally 49 is provided which includes a bus connection 50 for the I/O bus of the present invention, and a peripheral bus connection 51 for a peripheral device on the data processing module which uses the bus 50. The integrated circuit chip includes an I/O bus interface generally 52, a buffer generally 53, and a peripheral bus interface generally 54.

The bus connection 50 includes address-data lines B(31:0) on line 55, and control lines B(32:42) on lines 56. These lines are described in detail below.

The control lines are supplied to the I/O bus interface 52 and are involved in control of bus state machines, generally 57. State machines 57 includes an arbitration state machine 57-A, a request state machine generally 57-RQ, a monitor state machine 57-M, and a reply state machine 57-RP. The address and data lines 55 are also supplied on line 85 to arbitration logic 57-A. Thus, it can be seen that the arbitration signals on line 85 are a subset of the address signals on line 58. Furthermore, the address lines are a subset of the data lines. This provides for sharing the same set of lines on the bus for the three functions of arbitration, address transfers, and data transfers.

The address and data lines 55 are coupled across line 58 through the buffer 53 to the peripheral bus interface 54 to drive peripheral bus address and data lines generally 59. Also, the address and data lines 55 are driven by line 60 from the buffer module multiplexer 61. Buffer module multiplexer 61 is driven by an address RAM 62, an event/interrupt mechanism 63, and address mapping logic 64 in the peripheral bus interface. The address mapping logic 64 receives address from the peripheral bus address and data line 59.

The event-interrupt mechanism 63 translates events and interrupts detected on the peripheral device to bus messages.

The address RAM 62 is also coupled to an address comparator 64 and byte validity logic 65. The comparator 64, byte validity logic 65, and address RAM 62 are used in managing a read cache and a write buffer for the buffer module 53.

Also, the buffer module includes store state machines generally 66 including a state machine 66-FP for filling the write buffer and posting data to the read cache, and a state machine 66-C for serving the I/O bus. In addition, timers 67 are maintained in the buffer module 53.

The peripheral bus module 54, in addition to the address mapping logic 64 includes state machines for handling the I/O bus and the peripheral bus. The I/O bus is handled by state machine 68 and the peripheral bus is handled by state machine 69. Further, peripheral bus control signals are generated by module 70.

The data block diagram for the interface chip is shown in FIG. 3. As can be seen, the address and data signals B(31:0) on line 55 are supplied through the I/O bus module 52 on line 71 to a write buffer 72 and bypassing the write buffer on line 73 to multiplexer 74. The second input to multiplexer 74 is data out of the write buffer 72. The output of the multiplexer 74 is supplied to the peripheral bus interface on line 75 for supply on output lines 59. Incoming data is transferred on line 76 to a read cache 77 for the I/O bus, and bypasses the read cache on line 78 to multiplexer 79. Other inputs to multiplexer 79 include the output of the read cache 77, the output of the address RAM 62, and the output of the byte validity logic 65, which are provided for control of the write buffer 72 and read cache 77. The output of the multiplexer 79 is supplied on line 80 to I/O bus output drivers 81.

Logically included in the I/O bus interface 52 are bus configuration registers 82 and peripheral device interface registers 83. The bus configuration registers are described in more detail below and set out such things as arbitration identifiers, arbitration masks, slot identifiers, and the like. The interface device registers 73 are used for address mapping for the particular processing module, which is coupled to the peripheral bus connector 51, and other purposes as necessary for the particular device.

The I/O bus and the peripheral device operate asynchronously. Thus, in the integrated circuit 49, a synchronization boundary, generally 84 is included to synchronize transfers of address and data.

II. Bus Operation

There are five basic transfer types on bus:

1. Memory transfers occur between IO modules and a shared memory residing on the same card as the main processor (i.e., core memory 14). Memory transfers are distinguished by having the memory pin (described later) asserted at an appropriate point in the cycle.

2. Init space transfers are initiated by the main CPU (i.e., processor 15) to read or write from a space associated with module initialization, configuration, and status. Each card has its own section of Init space which is a part of overall system Init space. Init space is geographically addressed. That is, the position of a card's Init space within overall Init space is determined by the physical location, or slot number, of a card. An Init space transfer can be distinguished by the memory pin inactive at the appropriate point in the cycle, and an address corresponding to the statically assigned Init space.

3. Interrupt transfers are initiated by modules to inform the main CPU of an interrupt condition on a card. The address of an interrupt identifies the receiving card. This address is also assigned geographically. An interrupt transfer can be distinguished by an inactive memory pin and an address corresponding to the statically assigned interrupt space.

4. Configuration transfers exist for the purpose of establishing a connection between the main CPU and IO module cards. A configuration transfer normally occurs only once, immediately after a board is inserted into the system, or after the system is powered up.

5. IO space transfers are defined as any transfers in which the memory pin is inactive, and the address falls into statically assigned IO space. More details are given regarding each of these transfer types later in this document.

In order to understand the transfers on the bus, a definition of the bus configuration registers and of the signals on the bus is provided as follows.

A. Bus Configuration Registers—Definition

The bus configuration registers represented by register block 82 in FIGS. 2 and 3 are used for controlling bus operations and for configuring devices on the bus. A definition of register contents is provided as follows:

Slot Number: (Offset=0) This is a 4 bit register providing the encoded slot number, from zero to 15 in the lowest four bits.

Arbitration & Priority ID: (Offset=04H) This 4 bit register provides a device with an encoded arbitration ID in the lowest four bits. The priority bit used by the device is determined by adding 16 to the arbitration ID. Note that the I/O bus interface drives both its arbitration bit and its priority bit at the same time, though it may not assert either. An arbitration ID of 2 means that bit (2) of B(15:0) on the I/O bus is used as the arbitration bit during an arbitration cycle.

Arbitration Mask: (Offset=08H) This 16 bit register is used to mask (AND) arbitration/priority levels on bus. Thus, 0's are set in every bit corresponding to non-existent cards, and 1's are set in every bit corresponding to existing cards.

Revision Register: (Offset=0CH) This 4 bit read only register gives a revision number for the interface device.

Bus Device Type: (Offset=10H) This four bit register gives a hard coded bus device type. Different bus interface devices may have different register configurations so software must check the value in this register before attempting to program the device.

Write Protect Configuration: (Offset=14H) This eight bit register must be written with an eight bit code which is related to the device type and revision number in order to unlock the write protect. Writing any other value will turn on the write protect. The write protect value for example may be 26 (hex). The interface powers up with write protect on. The purpose of write protect is to prevent software from inadvertently writing over the contents of the configuration registers, or peripheral registers. Two registers are exempt from the effects of this write protect. One is the slot number register, and the other is the write protect configuration register itself. If a write to a peripheral register is attempted while the write protect is on, then the cycle will take place but all of the byte enables going out will be zero. If a write to a register internal to the bus interface is attempted while the write protect is on the data will not be written but no external indication of this fact will take place.

Parity Error Byte Flags: (Offset=1CH) This five bit register is used for the I/O bus and has one or more of its five bits set to indicate which bytes at the affected address caused a parity error. The appropriate bits in this register are written by a bus device receiving bus data with bad parity. The least significant bit is set for an error DERR7:0 on D0–D7 from the bus, the second most significant bit is set for an error DERR24:31 on D24–D31 on the bus. If the most significant bit is set, an error APERR is indicated in the address parity.

response is given to the interface on a request. In addition, the interface would signal an error condition to the processor by asserting the error signal on the bus for one clock.

BOVFLW: This bit is set after a backoff error is detected on the bus. This error would occur after the interface acting as a bus requestor received more than 16 consecutive backoffs from a replier. The error is cleared and normal activity is resumed after the processor clears this bit. The detection of a backoff error will cause the interface to assert the bus error signal for one clock.

CBPERR: The bit is set after a parity error is detected on the bus. A bus parity error generates a pulse on the error signal, and sets this bit. This bit is cleared by the processor. Setting this bit causes a one clock pulse on the error signal.

C1I: The C1I bit is set by the interface when an interrupt has been asserted on the peripheral bus interrupt 1 and transferred as an interrupt cycle on the bus. Clearing this bit or any of the other status bits is not necessary to permit further interrupts to pass through the interface. The bit is cleared by the processor.

C0I: The C0I bit is set by the interface when an interrupt has been asserted on the peripheral bus interrupt 0 and transferred as an interrupt cycle on the bus. The bit is cleared by the processor.

C1E: The C1E is set by the interface when an event has been asserted because of some peripheral bus action and transferred as an event cycle on the bus. The bit is cleared by the processor.

Interrupt Destination: (Offset=28H) This four bit register provides a four bit encoding of the destination card number used in interrupt space address by the interface.

Bus Device Configuration: (Offset=30H) There are several bits in this register which affect the operation of the device. The bits in the register are organized as indicated below:

(MSB ———> LSB)
x x x APERR DERR31:24 DERR23:16 DERR15:8 DERR7:0

Interrupt Status: (Offset=24H) This register shows the interrupt status. The bits in this register are set by the interface and each can be cleared individually by setting the appropriate bit position. (Writing a clear value has no effect, regardless of whether the bits are already set or not.)

(MSB <——> LSB)
x NH BOVFLW CBPERR C1I C0I C1E C0E

NH—Nobody Home: This bit is set after a nobody home (MSB ———> LSB)
X  X  PBRES  SCRES  SWRES  ARBE  PBE  CBE PBRES: When this bit is set, the reset signal is asserted on the peripheral bus. This bit is set as a side effect of setting the SCRES, or SWRES bits. This bit is designed to reset the peripheral only. Upon power up, this bit is set.

SCRES: When this bit is set, it initiates a warm reset of the interface and also resets the peripheral. A warm reset stops operation of the device and returns it to a known free and idle state, disabling operation, but does not reinitialize the values of registers. The device clears this bit when the reset is completed. The software should not set a second reset bit before the first is cleared, although it may set multiple bits at once. Setting this bit also sets the PBRES bit. The SWRES bit can be set by the ERR* signal being asserted more than 12 clock periods.

ARBE: This enables the device to drive its arbitration bit on the bus. Note that driving its arbitration bit is not the same as asserting its arbitration bit. This bit is cleared as a side effect of setting the SCRES bit.

PBE: Peripheral Bus Enable. This enable the interface on the peripheral bus side of the device. While this bit is cleared, the interface will not yield bus mastership to the peripheral if the M/S* bit is set. Furthermore, it will respond to a cycle with a perpetual not-ready indication. In addition, those signals which the interface might either drive or receive on, depending on configuration bits in the interface, are held high z until PBE is set. For example, the HLD and HLDA lines are both high z until the PBE bit is set. This bit is cleared as a side effect of setting the SWRES bit. It is also cleared when the ERR* signal is asserted if this device was an active participant in a bus cycle when ERR* was asserted.

CBE: This enables the device to transmit over the bus. When disabled, the device may still participate in arbitration. This bit is cleared as a side effect of setting the SWRES bit. It is also cleared when the ERR* signal is asserted if this device was an active participant in a bus cycle when ERR* was asserted.

B. Signal Definition

The bus of the present invention is a three phase bus. The three phases are arbitration, address, and data. The definition of signal pins changes depending on which phase state the bus is in. The table below lists pin numbers and associated definitions for each of the three phases:

| Pin   | Arbitration | Address | Data    |
|-------|-------------|---------|---------|
| 0–15  | Arbitration | A0–A15  | D0–15   |
| 16–31 | Priority    | A16–A31 | D16–D31 |
| 32    | Lock        | Memory  | DP3     |
| 33–35 |             | BC0–BC2 | DP0–DP2 |
| 36    | Error*      | Error*  | Error*  |
| 37    | Clock       | Clock   | Clock   |
| 38    |             | R/W*    | Status0 |
| 39    |             | 1       | Status1 |
| 40    | Busy*       | Busy*   | Busy*   |

-continued

| Pin | Arbitration | Address | Data          |
|-----|-------------|---------|---------------|
| 41  | Breq*       | Breq*   | Breq*         |
| 42  |             | AP      | Requestor Rdy |

Both the Breq* signals and the Error* signal are shared open collector (or open drain) signals. In addition to the signals above, there are several signals which are not associated with any of the phases above and may not connect to every bus ASIC. These signals are referred to elsewhere as "bus only" signals. They are:

| Pin | Description  |
|-----|--------------|
| 43  | Clock Source |
| 44  | Bus Master   |
| 45  | Config       |

A bus extension can be defined in which pins 46–77 carry data bits 63-32 and pins 78–81 carry parity DP4–DP8 for the extra data. Also, the arbitration and priority lines may be similarly expanded for the extended bus.

A detailed description of the signals using the signal names listed above is provided as follows. In this description, the signals are divided into phase independent signals, arbitration phase signals, address phase signals, data phase signals, and bus only signals.

1. Phase Independent Signals

Clock. This is the system wide clock signal.

Error*: This open collector signal is shared by all bus devices. A device may pull on the Error* signal to indicate a catastrophic error. The only predefined causes for this are a parity error detected at the receiver, and a bus watchdog timer timeout. Asserting the Error* signal forces all bus devices back to the free, idle bus state on the next clock. If the Error* pin is asserted for between twelve and twenty four consecutive clocks, the effect for all bus devices is global system warm reset. If asserted for 24 or more clocks, the effect is a global system hard reset. Note that since the Error* signal takes two clocks to float to the appropriate value after released it may be sampled at an indeterminate state and care must be taken to present metastability problems. The state machines must look at the synchronized error signal in the clock after it is first asserted to determine a possible warm reset. See the section on Errors for more information on how the Error* pin is intended to be used.

2. Arbitration Phase Signals

Arbitration: This group of signals is used in conjunction with priority and lock* to determine who acquires the bus during the next available time period. Each device is assigned one of sixteen unique arbitration bits. The device then asserts its appropriate bit during any arbitration phase. A low bit indicates a device does not want the bus, while a high bit indicates the device wants the bus. An arbitration mask is constructed by a bus master which masks out arbitration bits which are not assigned to any card. The arbitration bits on higher pin numbers have higher priority.

Priority: Priority works much like arbitration. There are sixteen priority levels. A priority level wins over any arbitration level in acquiring bus. Priority is designed to let bus devices acquire the bus more quickly when they have special needs. For example, a device might use its priority bit when it has a buffer full condition, or an interrupt. When a device is using its priority arbitration bit, the rules for participation in the arbitration phase also differ slightly. Ordinarily, when multiple devices enter into arbitration simultaneously they must all be serviced before new devices can request service. If a device uses its priority bit, it can enter into the first arbitration phase it sees on the bus. This is described in more detail in the description of operation. When a device asserts its priority bit, it must also assert its corresponding arbitration bit. The priority bit for a given device is always asserted (high or low) during every arb phase.

In the examples below, the device winning the arbitration is the device driving the bit with the capital W above it.

Priority and Arbitration:

| highest priority | lowest priority | highest Arb | lowest Arb |
|---|---|---|---|
| 15 | 0 | 15 | 0 |
| B(31) pin | B(16) pin | B(15) pin | B(0) |

Examples:
PRI15               PRI0        ARB15               ARB0

0 0 0 0 0 0 0 0 0 0 0 0 0 0 0 0| 0 0 0 0 0 0 0 0 0 0 0 0 0 0 0 0

W
0 0 0 0 0 0 0 0 0 0 0 0 0 0 0 0| 0 0 0 1 0 0 0 1 0 0 0 0 0 0 0 0

W
0 0 0 1 0 0 0 1 0 0 0 0 0 0 0 0| 0 0 0 0 1 0 0 0 1 0 0 0 0 0 0 0

W
0 0 0 0 0 0 0 1 0 0 0 1 0 0 0 0| 0 0 0 0 0 0 0 1 0 0 0 0 0 0 0 0

W
0 0 0 0 0 0 0 0 0 0 0 0 0 0 0 0| 0 0 0 0 0 0 0 1 0 0 0 0 0 0 0 0

Lock: This signal can only be asserted by a device during the inter-arbitration which occurs immediately after it has already acquired the bus. The effect is that the device automatically wins the next arbitration. This allows a bus device to guarantee that no other device will access shared memory during a locked transfer. The effects of a locked transfer should be extended to the peripheral bus side of the device in order to preserve the meaning of a locked transfer.

Breq*: This signal is asserted by a device to indicate it desires to acquire the bus. It is released by the device after it has acquired the bus, on the rising edge which initiates the address phase. Because this signal takes one and a half clocks to return to a high value after deassertion, care must be taken to prevent metastability problems with this signal by masking it out when it may be indeterminate. The Breq* signal will only be released off of the rising clock edge initiating an address phase.

3. Address Phase Signals

A0–A31: These signals convey the 32 bit byte address.

Memory: This signal indicates whether the transfer is to memory space or not. If it is not to memory space, it may be in configuration space, initialization space, interrupt space, or IO space. The distinction between various address spaces which are not memory is made by address range.

BC0–BC2: These three signals indicate the number of bytes requested in the transfer. This count is a binding commitment by both requestor and replier to transfer the indicated quantity of data. The following table presents the possible values of BC0–BC2.

| BC2 | BC1 | BC0 | Number of Bytes |
|---|---|---|---|
| 0 | 0 | 0 | 1 |
| 0 | 0 | 1 | 2 |
| 0 | 1 | 0 | 4 |
| 0 | 1 | 1 | 8 |
| 1 | 0 | 1 | 12 |
| 1 | 0 | 1 | 16 |
| 1 | 1 | 0 | 28 |
| 1 | 1 | 1 | 32 |

R/W*: This signal indicates whether the transfer is a read or write from the perspective of the requestor.

AP: This is a signal parity bit to check the entire 32 bits of address. As with data parity, the address parity is defined as even, so that the parity across all 33 bits (address and the parity bit) is even, having an even number of ones.

4. Data Phase Signals

D0–D31: These signals carry the data. During a transfer which is less than a word in size only the least significant bits are relevant. All bits are actively driven, however. The parity for the bus is even; that is, the parity bits is added so that the nine bits (data plus parity) have an even number of ones.

The following table identifies the valid data signals for a given address having address bits A1 and A0, and the size in bytes for a given data transfer.

| A1 | A0 | Size (bytes) | Valid Signals |
|---|---|---|---|
| 0 | 0 | 1 | D24–D31 |
| 0 | 1 | 1 | D16–D23 |
| 1 | 0 | 1 | D8–D15 |
| 1 | 1 | 1 | D0–D7 |
| 0 | 0 | 2 | D16–D31 |
| 0 | 1 | 2 | RESERVED |
| 1 | 0 | 2 | D0–D15 |
| 1 | 1 | 2 | ILLEGAL |
| 0 | 0 | 4 | D0–D31 |
| 0 | 1 | 4 | RESERVED |
| 1 | 0 | 4 | RESERVED |
| 1 | 1 | 4 | RESERVED |

The bus is big endian. For example, a word write of 32 bit data 01 23 45 67 (hexadecimal) written out to address 0 followed by a byte read from address 0 would return the value 01 (hexadecimal). Big endian was chosen because most network protocols are oriented to big endian control structure. Software will be relied upon to perform any translation for devices which do not operate in big endian mode. In general, it is expected that the designer will arrange for any devices which operate in little endian mode to place data in memory in big endian mode. Thus, the software must only translate the control structures.

DP0–DP3: These signals carry parity. During a transfer which is less than a word in size, all bytes still have correct parity. DP0 is associated with D0–D7, and DP3 with D24–D31.

Status0–Status1: These two signals are a status return from the replier to the requestor. They can assume the following four states: (1) Hold (not ready) indicates that the replier is not ready to complete the request but expects to be ready soon and the connection should be maintained. (2) Backoff indicates the replier is in some special situation and must ask the requestor to break the connection and retry after a time period indicated by the backoff counter (see description of Init space registers). This will occur if the peripheral bus is actively requesting a bus transfer at the same time the bus is actively requesting a peripheral bus transfer. This is a deadlock situation which can only be resolved by having the requestor retry. The requestor should relinquish the bus when given a backoff status, and retry after 16 clock cycles. (3) Ready indicates the replier is ready with the requested data (or ready to receive the requested data) on the bus in the same clock as ready is asserted. (4) Nobody Home indicates that no card is responding at the requested address. This is helpful in preventing bus lockup when accesses to illegal addresses occur, and is also crucial to initialization.

| Stat1:Stat0 | Description |
|---|---|
| 00 | Not Ready |
| 01 | Backoff |
| 10 | Ready |
| 11 | Nobody Home |

Busy*: This signal is driven low by the requestor to indicate that a bus cycle is in progress. It is used to determine the end of transfer and also indicates the beginning of a transfer.

Requestor Rdy: This signal indicates the requestor is ready to complete the transfer of a single data item. It is important because during a burst transfer a replier may be able to respond more quickly than the requestor. The requestor may hold off the reply by deasserting Requestor Rdy.

5. Special Bus Only Signals

Clock Source: This is the outgoing clock signal. In order to minimize clock skew, the clock is driven out onto the bus and back into the source card. This scheme also simplifies implementation of multiple bus masters.

Bus Master: This signal is ground in the slot which is supposed to be the bus master and open in the slot which is not. This allows the same card to function as bus master or not, as required. The card in the bus master slot will see the bus master pin low and determine that it is to drive the clock, and initialize the other bus devices. Otherwise, it will be pulled up to +5 and simply respond as a typical bus device.

Config: This signal is one of the address lines on the backplane that comes out of the connector on the IO module in two places: as an address signal and as a config pin. Slot zero is the upper left slot and slot eight is the upper right slot. The numbers progress counter clockwise. Slot number N has address line N connected to config in that slot.

III. Description of Operation

In order to discuss the operation of bus, some terminology must be agreed upon: a clock is one clock period long. A phase is a clock during which a particular group of signals are asserted. A phase may be positive, or it may be negative. A positive phase starts and ends on a positive edge of the clock, while a negative phase starts and ends on a negative edge of the clock. A slot is the portion of bus time used by one agent to perform its complete transfer. The slot begins when the agent acquires the bus and no other agent is using the bus. A cycle is a group of one or more slots formed by several agents inadvertently entering a bus request at the same time. The arbitration which is done within another transfer is the inter-arbitration. Some of these terms will be defined more clearly in the subsequent text.

A. Transfer Overview

The basic format for a transfer is shown below decomposed into its component phases. The names of negative phases end with a "−", while the names of positive phases end with a "+".

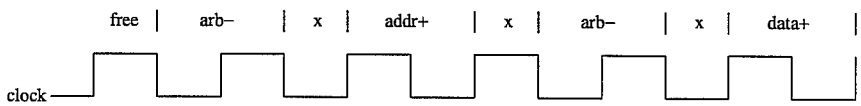

The portions marked "x" are unused dead time inserted to allow time to turn around the bus and avoid tristate fights. If the dead time is ignored the cycle condenses to:

Free Arb−Addr+Arb−Data+Free, which is the minimum length transfer. The second Arb− is the arbitration referred to earlier as the inter-arbitration. When the bus is busy and there is another party desiring to use the bus while a transfer is going on, the arbitration for the second bus use may occur in the inter-arbitration phase during the first transfer. Because there would otherwise have to be a dead time between Addr+ and Data+ to allow for address decode and data retrieval, this allows the second transfer to commence immediately after the first transfer completes, yielding more efficient utilization of the bus. In the examples shown above, no other devices desired the bus during the first transfer, hence during the inter-arbitration period all devices asserted their arbitration bits, and the bus returned to the free and idle state following the transfer. If the bus had been desired by another device, the pattern would have looked like this:

| Phase: | Free | Arb− | Addr+ | Arb− | Data+ | Addr+ | Arb− | Data+ | Free |
|---|---|---|---|---|---|---|---|---|---|
| Transfer #: | x | 1 | 1 | 2 | 1 | 2 | x | 2 | x |

The phases are given transfer numbers above to help identify which transfer they are associated with.

B. Arbitration Phase of Transfer

Starting from the free and idle bus, a requestor indicates his desire for the bus by asserting Breq* on the falling edge of bus clock. The assertion of Breq* is required as a precursor to the cycle in order to indicate to every bus device that it must drive its arbitration signals during the subsequent clock period. This assertion of Breq* occurs during the period marked free on the diagram above. If only one device desired the bus at that particular time, then it would be the only device pulling Breq* active. However, it is possible that multiple devices decided to request the bus at the same instant. On the next falling edge of the clock the arbitration phase begins. All bus members must drive their arbitration ID regardless of whether or not they desire the bus. All devices desiring the bus must drive their arbitration bits active. Arbitration ID bits which are not assigned to any device will float. This is the reason for the use of the arbitration mask. This mask will be ANDed with values on the bus to prevent the floating bits from affecting the results of arbitration.

When devices are asserting their arbitration bits, that is once a device or group of devices have entered into an arbitration cycle by all asserting Breq* at the same time, no other device may arbitrate for the bus until all devices which entered into the first arbitration have been serviced, as indicated by Breq* going high. This provides some sort of fairness in that any device desiring the bus will eventually get it, regardless of what other devices with higher arbitration ID are doing. An exception to this occurs when devices use their priority bits for arbitration. Not only does the use of priority enable a device to win arbitration from any other device using normal arbitration bits, but is also allows a device to violate the rule above. A device requesting a priority transfer may assert Breq* at the beginning of any arbitration phase, as well as at the free state. The priority bit, however, is only asserted during an arbitration phase. This allows a device requesting a priority transfer to obtain low latency access to the bus.

C. Address Phase of Transfer

During the half clock dead period between Arb− and Addr+, devices have time to tristate their output buffers, and decode the results of arbitration to determine if they have won the bus. The winning device asserts its requesting address and Busy* on the bus during the next positive clock edge, starting the address phase. It also drive R/W*, BC0−2, and memory signals on the bus. Finally, it masks off Breq* on the rising edge to signal that it no longer needs the bus. On the next rising edge, concluding the address phase, all bus devices latch this information. All potential receiving devices decode the supplied address. The requestor must tristate the signals it was driving within the half clock between the address phase and the inter-arbitration phase. Halfway through the address phase, on the falling edge of the clock, the requestor releases the Breq* signal to indicate that it is no longer requesting the bus.

D. Inter-arbitration Phase of Transfer

There are two major situations which can exist upon entering the inter-arbitration phase. In the first, a device entered arbitration on the previous arbitration (initial or inter-arbitration) phase, but lost. It will still be asserting Breq*, however. In the second case, no device lost in the previous arbitration (or inter-arbitration). If the situation is that of the first case, then only devices which lost in the previous arbitration (inter-arbitration) may drive their arbitration bits ow in this phase. (use of priority is an exception to this) In the second case, devices note Breq* is high and enter into a new arbitration. It is still possible for the device currently using the bus to repeat its arbitration using lock. Note that Breq* is masked off by the requestor coincident with driving the address out, on the rising edge of the clock. This allows one and one half clocks for Breq* to float to a high value.

E. Data Phase of Transfer

During the data phase of the transfer, which begins on the positive clock edge following the end of inter-arbitration, the requestor or replier places data and parity information on the bus. In addition, the requestor drives Requestor Rdy and Busy* to the appropriate levels. Busy* was already asserted during the address phase, and would be deasserted during the data phase if the transfer was complete. The replier drives Status0−1. At the end of any data phase a status of hold, or Requestor Rdy unasserted, will prolong the data transfer. If both Requestor Rdy and Status=ready, the individual data transfer is completed. If the Busy* signal is deasserted at the same time as an individual data transfer is completed, then entire data transfer is complete, and the system progresses to either the free state or the address phase depending on whether or not the last inter-arbitration was used (as indicated by Breq* being driven low at the beginning of inter-arbitration). In no case should a requestor deassert Busy* before transferring the quantity of data indicated in the BC field. If the Busy* signal is asserted at the same time an individual transfer is competed, this indicates that the burst data transfer will continue. Note that the maximum length for a burst is eight words. Note that during an IO space transfer, bursts are not allowed.

F. Interrupts and Events

Interrupts and events are distinguished from other transfer types by an address conforming to the form:

| | |
|---|---|
| DIK00XXX (hex) | Interrupts |
| BIK00XXX (hex) | Events | where K is the bus number, for a processor which connects to multiple buses; and I is the destination card's slot number. The source is implicit: any device being interrupted ought to know of the possible interrupt sources at a given interrupt level. XXX represents reserved bits. An interrupt requires the memory signal to be unasserted, indicating a transfer not in memory space.

In an interrupt or event transfer, the address mentioned above is followed by a single data word. That word has 32 bits, each of which is linked to an interrupt/event level. Any bit in the 32 bit word which is set indicates that an interrupt has taken place on that level. The interrupts are prioritized with interrupt/event level 31 being the highest priority and arriving on D31, and Interrupt/event level 0 being lowest priority and arriving on D0.

Each bus interface is assigned some of these 32 bits to use at its interrupt/event levels through device specific registers when the bus master initializes the bus through Init space. In addition, the interfaces are assigned a destination card to send these interrupts/events to. This allows prioritizing interrupts from various interfaces but only requires the receiver to store a single 32 bit word. More than one card in the bus can be a receiver of interrupts.

The distinction between interrupts and events is generally made at the device receiving the original interrupt. The device will count events, signalling them to the destination card as they are received. After a specific number of events, an interrupt is generated. This mechanism of counting events allows a fixed amount of resources (such as memory buffers) to be allocated to an intelligent peripheral. The CPU need only intervene to service the peripheral when convenient. The CPU need only intervene to service the peripheral when convenient, or when an interrupt is generated indicating the peripheral is about to run out of resources.

When an interrupt is received, the receiving device must service the interrupt and clear the interrupt first at the receiving device, then at the original (which may or may not be the sending bus device) and finally at the sending bus device if it was not the origin of the interrupt.

G. Init Space Transfers

Init space accesses are indicated by the memory signal unasserted, and an address of form:

ESKOXXXX

Where S is the geographical slot number, and K is the bus number. XXXX determines the location within the 64K byte Init space.

The purpose of Init space is to provide a predefined configuration and status area for those aspects of the system which are common to all bus devices. This will minimize the number of device specific aspects to a bus interface.

Below is a map of Init space. The addresses given below should be taken as the XXXX part of the address indicated above.

| Address | Size | Description |
| --- | --- | --- |
| 8000-FFFF | | 32K of byte wide configuration information. Only every fourth byte, at 0, 4, 8, C, 10 . . . is valid. |
| 0100-FFFF | | Device specific fields. |
| 0030 | | Bus Device Configuration |
| 002C | 8 | Backoff Counter |
| 0028 | 4 | Interrupt Destination |
| 0024 | 16 | Interrupt Status |
| 0020 | 32 | Address Generating parity error |
| 001C | 8 | Byte Flags for received parity error |

-continued

| Address | Size | Description |
| --- | --- | --- |
| 0014 | 8 | Write protect for bus configuration information |
| 0010 | 8 | Hard coded bus device type |
| 000C | 4 | Revision Register |
| 0004 | 16 | Arbitration mask |
| 0004 | 4 | Assigned Arbitration ID & Priority ID |
| 0000 | 4 | Slot Number |

A description of the various bus Init space registers is provided above in connection with bus signal definition.

Each devices will have additional status and configuration information accessible through the Init space but specific to the device's design.

In most devices, some sort of memory such as a PROM or EEPROM will be mapped into a configuration repeater area represented by block 83 of FIGS. 2 and 3. It will be used to hold configuration information not tied to the device type but rather to the device's in circuit application. For example, it may hold the ethernet address of an interface, or the type of ethernet controller connected to the device.

H. Power Up Configuration

There is a special address space called config space which is used for just one purpose: to assign a card its geographical slot number. A config space access is one in which the memory pin is unasserted and the address takes the form:

COKOXXXX

Where K is the bus number. The bus number is really a don't care from the point of view of any bus interface except the one which interfaces to the host processor. Each bus device has its config pin tied to a unique bit in the sixteen bit XXXX field. Accesses in this address range should only be done by the bus master, and should have only one of the bits in XXXX set at a time. The bus device, upon detecting its config pin active, and one of sixteen bits in XXXX active can determine which slot it is in. In slot zero, the device would see 0001 and in slot 15 it would see 8000. This config space access by the bus master will be a single byte write transfer in the data phase. The byte of data should correspond to the calculated slot number determined from the address. If it does, the device writes the byte wide value into the register designated as address 0000 in Init space, the slot number register. This slot number is used to determine the base address in Init space, and Init space is used to talk to the device from that time onward.

From the perspective of the bus master, it cycles around and assigns various cards their slot number. The bus master can determine which slots contain cards by looking at the hot swap register. This register indicates which slots physically contain cards. After determining which slots are occupied, the master may use Init space to look at a device's type, revision number, and configuration memory. After doing so, it can assign each device an arbitration/priority ID. It also constructs an arbitration mask for each device which masks out bits corresponding to unoccupied slots. The master may then assign an interrupt destination and other device specific configuration information. Finally, to conclude initialization, it can write into the write protect control for bus configuration commands. This is a precondition for activating the device and allowing it to "speak" on the bus. There are other preconditions to activating the device which are defined in a device specific manner.

Once a new card knows its slot number, it can be accessed and configured through Init space just like any other card. The inserted device can synchronize to activity on the bus by watching for the free state, as indicated by sampling a high level on Busy* during a rising clock edge and a high level on Breq* during the next falling clock edge, or by detecting a low to high transition on Busy* with Breq* held low, indicating that the next phase is an address phase. Until the inserted device synchronizes to bus activity it will not respond to configuration.

Note that during power up initialization, the master must mask out all other arbitration bits. After assigning arbitration IDs to a slot, the bus master must change its arbitration mask, and must change the arbitration mask of any other devices on the bus before the new device tries to initiate a transfer on the bus.

In the case of a hot inserted card, the hot inserted card will initiate no transfers initially. After it is assigned an arb ID and slot number by the bus master, it participates in arbitration but never asserts its arbitration signal. After the bus master has reassigned the arbitration masks for all other devices, it comes back and sets the hot inserted device to that it can initiate transfers on the bus.

I. The Error* Signal

Uses of the Error* signal are listed below.

1. Parity errors detected by the receiver.
2. Bus timeouts detected by the bus master.
3. Strictly localized errors such as peripheral bus errors, or bus backoff timeouts.
4. An error detected by software requiring a warm reset.
5. An error detected by software requiring a hard reset.

All receiving devices regenerate data parity and check it against incoming parity. If the two do not match, a parity error is generated. The receiving device will save a five bit mask indicating which bytes had invalid parity in the parity error byte flags register. (The fifth bit is for address parity.) In addition, it will assert Error* in the clock following the reception of invalid data. All devices on bus will return to the free state upon seeing the Error* pin asserted. In addition, any device driving the bus during the error or serving as a replier during the error will clear the CBE and PBE bits in the bus configuration register of the device. The bus master will save the arb ID of the initiator and the address of the receiver for every transfer. This allows the bus master to associate the Error* signal which comes one clock late with the exact transfer causing the error, and the two devices involved in transfer. Watchdog timeouts are handled in exactly the same way. In case of an error involving the bus master, the handling is slightly different; it is up to the host processor on the peripheral bus side of the master to deal with this error condition, and clear the status bit(s).

Strictly localized errors such as peripheral bus errors or bus backoff timeouts generate an interrupt to a processor, and reset the PBE CBE bits in the bus configuration register of the device.

The bus master will maintain a watchdog timer to ensure that transfers do not hang. If it detects a hung transfer, it will assert the Error* pin to indicate an error condition. All devices should reset their state to the free state upon detecting Error* active.

For various reasons, software may wish to generate a warm or hard reset. A warm reset will reset the PBE and CBE bits in the bus configuration registers of all devices on the bus, and force all bus device interfaces back into the free state. It will also cause the bus device interfaces to indicate to the peripheral bus circuitry that a warm reset is in progress, allowing a warm reset to be propagated globally throughout the system. Note that during warm reset, the bus master will want to use a temporary arbitration mask which masks out all other bits aside from its own, as other devices may not necessarily be counted on to drive their arbitration bits during an error situation.

A hard reset will reset the PBE and CBE bits in the bus configuration registers of all devices on the bus, and force all bus device interfaces back into the free state. It will also cause the bus device interfaces to indicate to the peripheral bus circuitry that a cold reset is in progress, allowing a cold reset to be propagated globally throughout the system. In addition to these actions, which are identical to a warm reset, all state information, inasmuch as possible, is reinitialized to the state it would be in after power up. Thus, a cold reset is intended to be identical to shutting the system power off and turning the system back on.

Software will handle errors by logging and performing the feasible actions to attempt recovery from an error. Logging errors may mean displaying a message on console, informing a remote network management station, or just updating some internal count. If errors are occurring at an unacceptable rate on any module, it will be shut down and the user will be informed. Only errors on the bus master should cause the entire box to shut down.

| Bus Address Map | |
|---|---|
| Address | Description |
| FFF000-FFFFFFFF | Reserved Area |
| ESK0xxxx | Init space for slot S, bus K |
| DIK0xxxx | Interrupt space for slot id I, bus K |
| COK0xxxx | Configuration Space for bus K |
| 00000000-BFFFFFFF | IO space |

J. Examples of Bus Transfers (FIGS. 4–7)

Several examples are shown in FIGS. 4–7 to illustrate the operation of the core bus.

Figure 4:
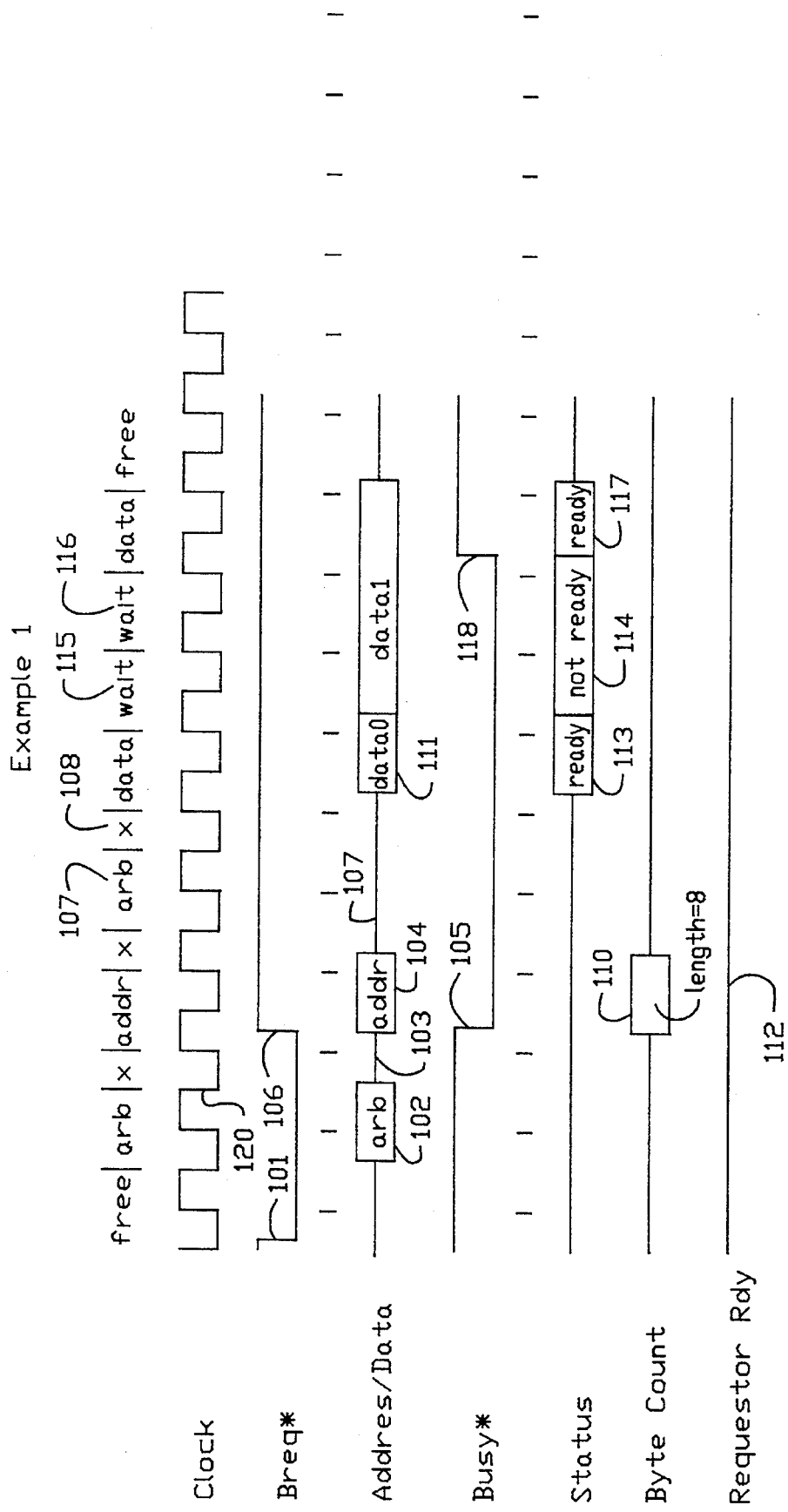
FIGS. 4–7 are timing diagrams which illustrate examples of bus operation.

Example 1—FIG. 4

Example 1 illustrates burst mode transfers, replier inducted wait states, and basic bus operation. The transfer initiates in the free state when device X asserts Breq* on the falling edge 101 of the clock to indicate that devices should drive their arbitration bits 102 during the next clock. All devices drive their arbitration bits 102 on the falling edge of the clock. All devices latch the arbitration bits on the next falling edge 120. A half clock of dead time 103 is provided between the arbitration phase and the address phase to allow time to decode the winner of arbitration, and also to prevent tristate fights. On the rising clock edge after arbitration, the device X determines it has won the arbitration and drives address information 104, and the R/W*, byte count 110, and memory signals. It also asserts Busy* 105 to indicate that there is a transfer in progress. It deasserts Breq* on the rising clock edge 106 initiating the address phase to indicate that it no longer is requesting arbitration. The fact that Breq* goes high at this point indicates that no other device requested the bus coincident with device X. If there had been other devices, the other devices would hold Breq* down.

At the conclusion of the address phase, all devices latch the address information. Devices overlap the decode of address and (if they are the selected device) preparation of status and data paths with the inter-arbitration phase 107. A half clock 108 elapses between address and inter-arbitration for bus turnaround. During the illustrated inter-arbitration, no device is asserting Breq*, and all arbitration bits are low. Thus, this arbitration is in some sense unused, which is why no indication of it is given in the address/data signals. Another half clock separates the inter-arbitration from the data transfer.

The data is placed onto the bus on the rising clock edge 111 after inter-arbitration. In addition, the requestor drives Requestor Rdy 112 (always high in systems that are assumed to be ready during burst transfers), and the replier drives status. In the example shown, both parties are ready and so the first transfer (data0) occurs immediately. In the next clock the replier indicates status of not ready 114, so wait states 115, 116 are inserted for two clocks. During the third clock, status ready 117 is asserted and the second data item (data1) is transferred. At this time, the requestor also brings Busy* high 118, indicating completion of the burst transfer.

Figure 5:
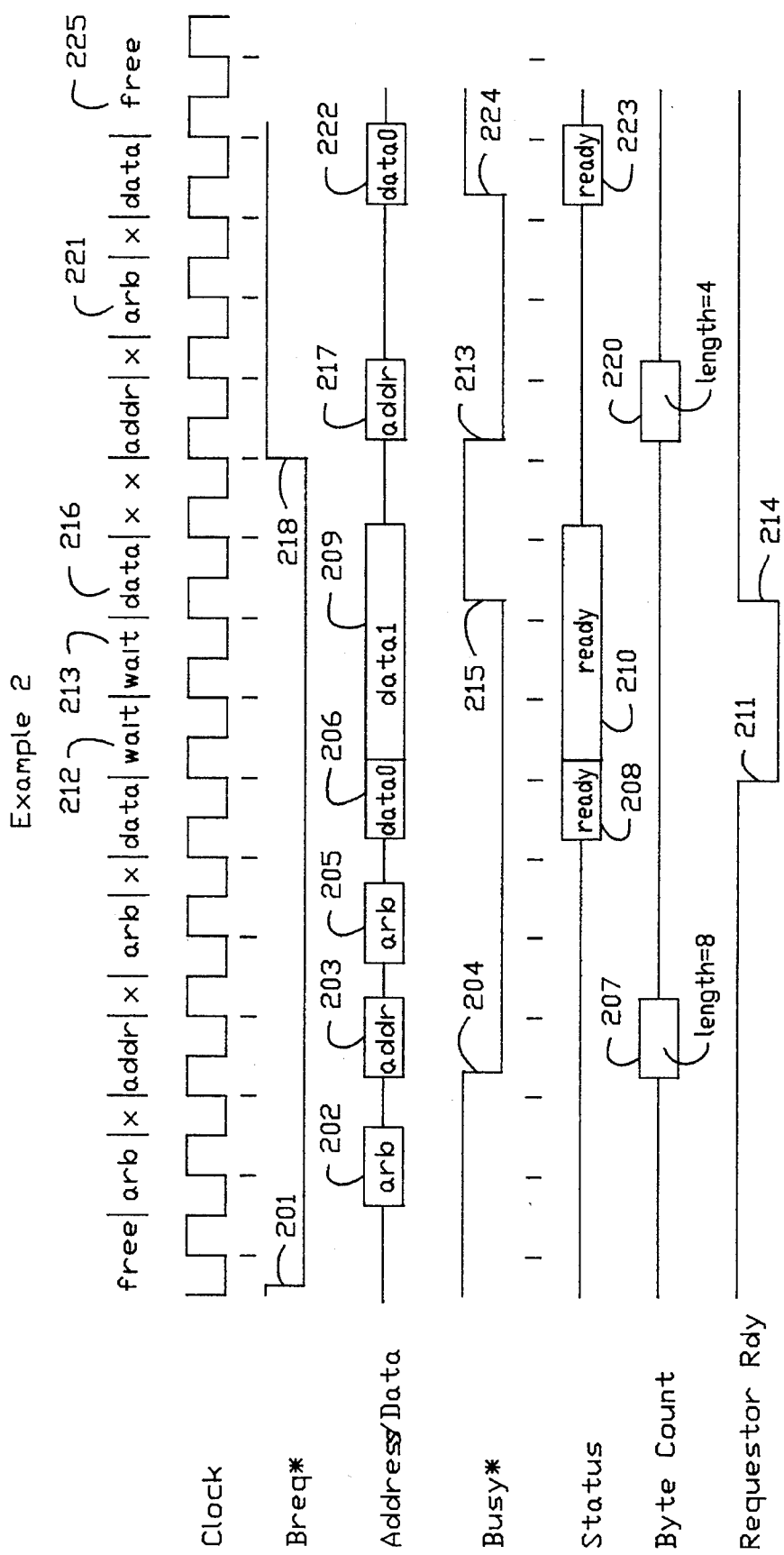

Example 2—FIG. 5

Example 2 shown in FIG. 5 illustrates two devices, call them X and Y, which request the bus at the same time. It also illustrates requestor induced wait states.

In Example 2, both devices X and Y assert the Breq* signal during the free state 201. During arbitration phase 202, device X wins the arbitration and stops driving its Breq* pin. However, device Y continues to pull the Breq* pin down until the beginning of its address phase. Thus, after the initial arbitration phase 202, the address for device X is driven during address phase 203. During the initial address phase 203, the byte count value 207 for a length=8 was asserted for device X. Simultaneously, the Busy* signal is asserted at point 204 by device X. After the address phase 203, an inter-arbitration phase 205 occurs during which the arbitration information is driven, and device Y wins. In the next data cycle, a first four byte data transfer (data0) is placed on the bus at point 206.

The replier asserts ready at point 208 during the data phase 206. Next, device X drives the second four byte work onto the bus at point 209. The replier to transfer X remains ready as indicated by block 210, however, requestor at device X pulls down the requestor ready signal at point 211 so that it can process the first four byte word data0 and prepare for receiving the second four byte word data 1. After wait states 212 and 213, requestor ready is again asserted at point 214, and the second data transfer 209 is completed. Upon completion, the busy signal is deasserted 215 at the end of the transfer of data1 209, the bus data phase 216 occurs and ends on the positive going edge of the clock. The next address phase begins on the next positive going edge of the clock and address for device Y 217 is asserted. Simultaneously, the device Y stops pulling Breq* low 218. Similarly, the busy signal is asserted 219 by device Y. The byte count signal 220 is also supplied. An inter-arbitration phase 221 occurs, and then the data for the device Y transfer 222 is transferred on the bus with a bus ready signal 223. The busy signal is deasserted 224 by device Y, and then the bus enters a free state 225.

Note that Breq* does not go high during the first address phase, indicating that a group of devices wanted the bus at the same time, and pulled on Breq* at the same time. Also, note that the Requestor Rdy signal goes low during transfers by device X causing wait states 212, 213 to be inserted.

Figure 6:
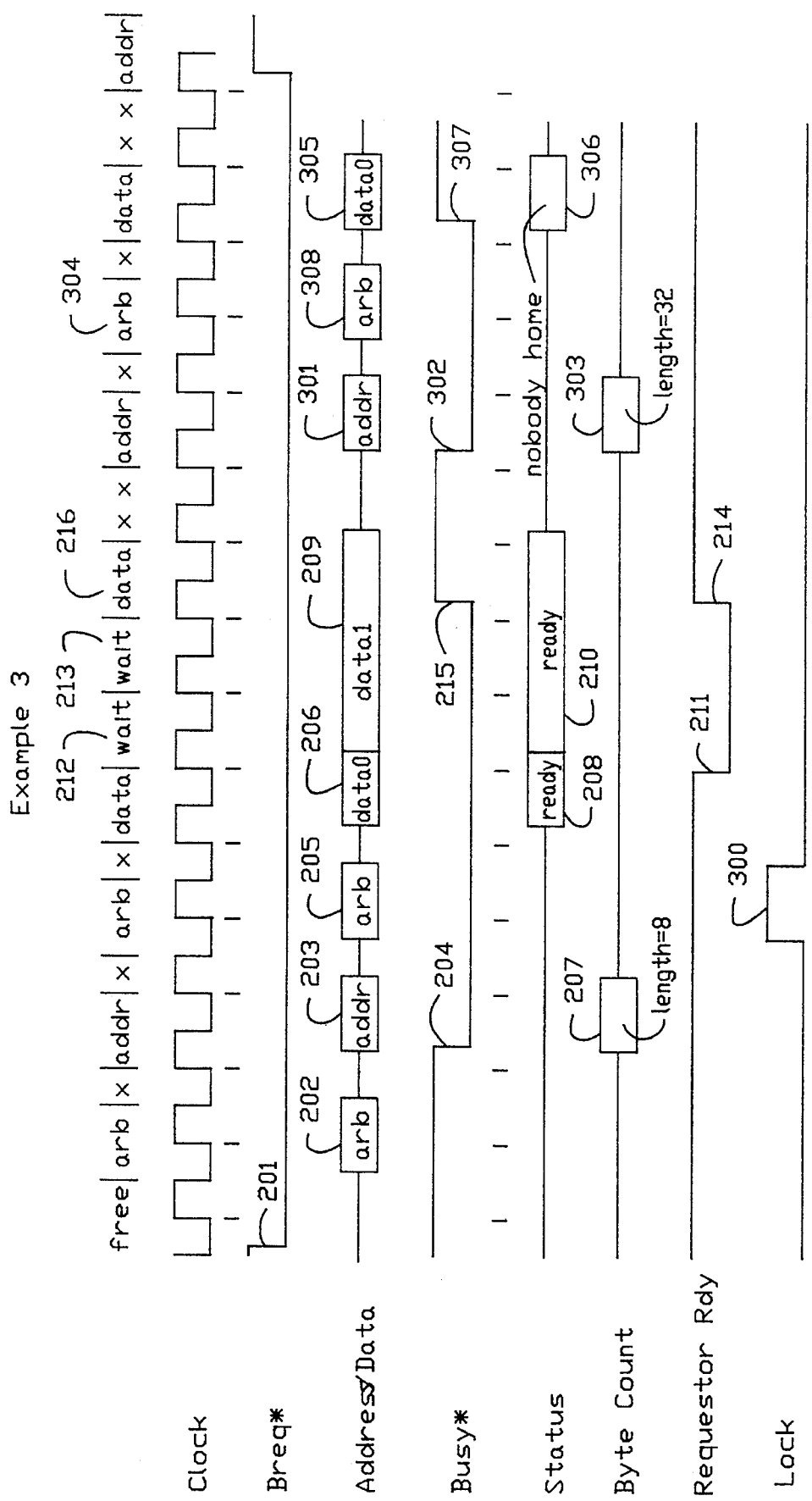

Example 3—FIG. 6

Example 3 shown in FIG. 6 illustrates a locked cycle, and a cycle in which a nobody home response is given. The figure is labelled with the same reference numbers as FIG. 5 for like cycles. Two devices enter into the initial arbitration as in FIG. 5, but during the first inter-arbitration phase 205; device X which acquired the bus from the free state asserts the lock signal 300 to cause an automatic win of inter-arbitration by device X.

Thus, address information 301 is driven by device X, the Busy* signal is pulled down 302 by device X, and a byte count signal 303 is supplied by device X. After the inter-arbitration phase 304, the first word of the transfer is driven on the bus 305. However, because the status lines return NobodyHome state 306, the busy signal is deasserted line 307, and the bus is relinquished. During the inter-arbitration phase 304, the second device, device Y, drives its arbitration information 308 and wins arbitration. This transfer is then completed after the bus is relinquished by device X (transfer not shown).

Figure 7:
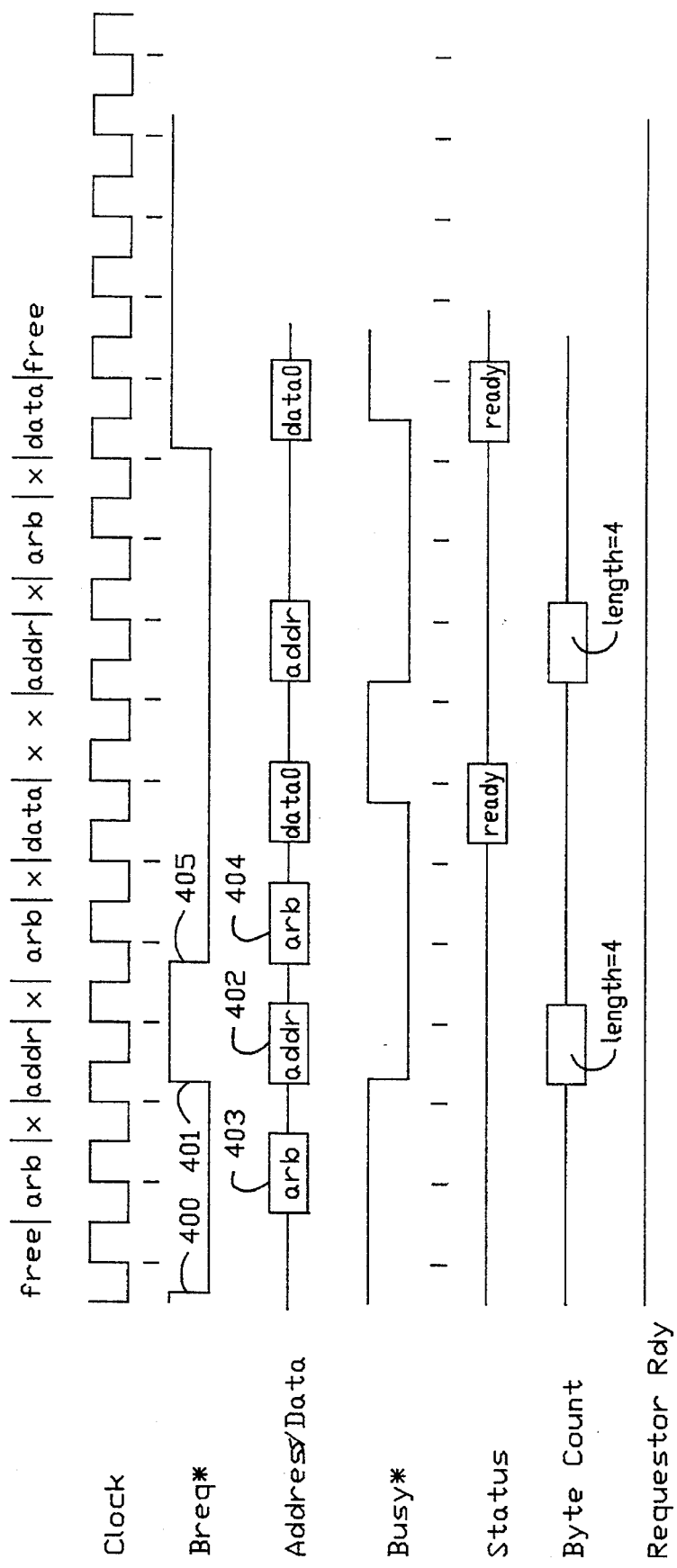

Example 4—FIG. 7

Example 4 shown in FIG. 7 illustrates in more detail how arbitration can still be pipelined into a previous transfer even when devices involved did not enter into arbitration at the same time. First device X requests the bus by pulling Breq* low 400. It releases the bus by deasserting Breq* 401 after arbitration phase 403 at the beginning of the address phase 402. By the beginning of the inter-arbitration phase 404, another device can detect that the Breq* signal is high and that it may reassert Breq* 405 to indicate desire for the bus. By doing so, it allows the arbitration to be pipelined in with the previous transfer, making better utilization of the bus.

IV. Bus Interface Logic (FIGS. 8–10)

Figure 8:
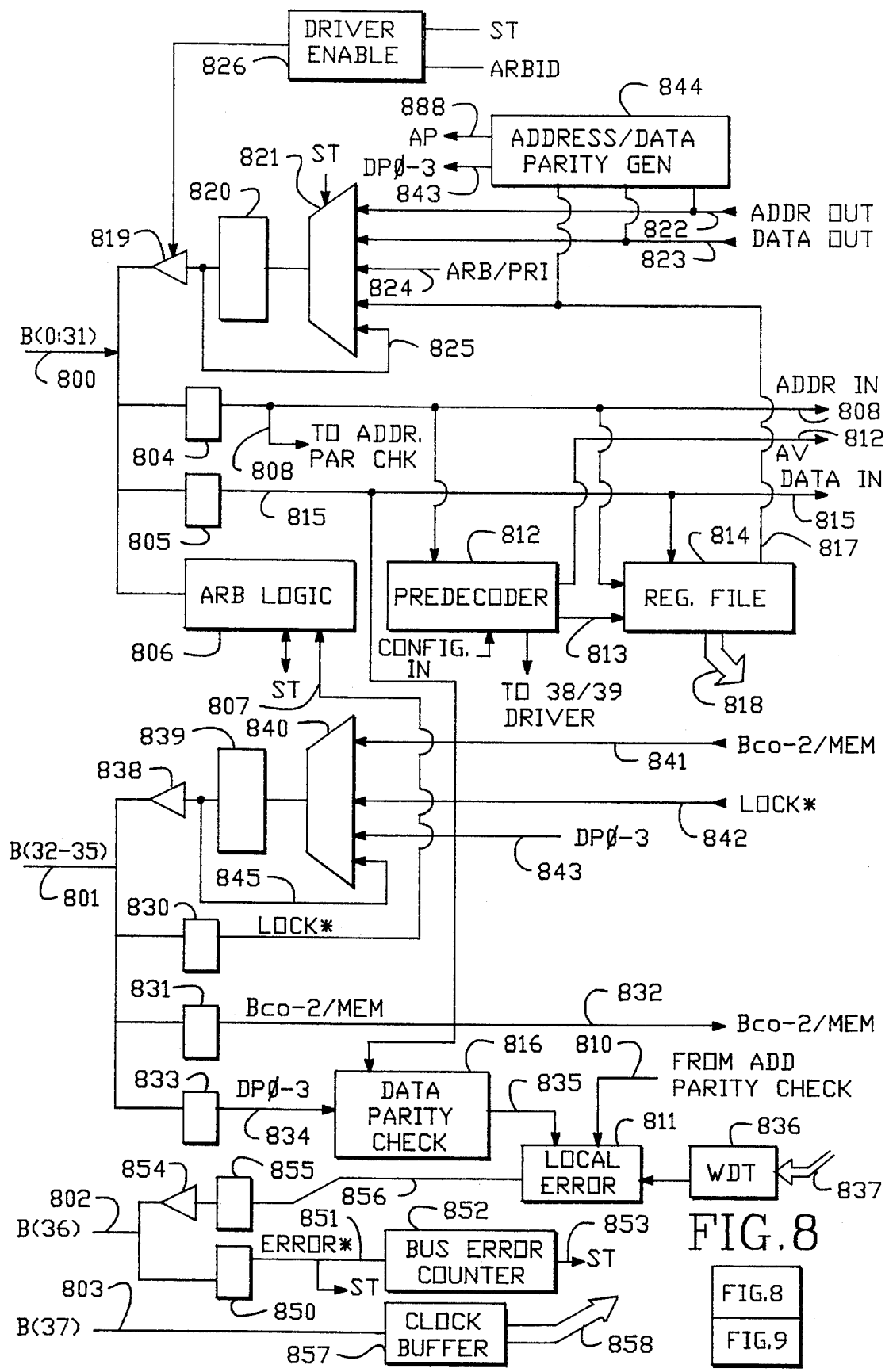
FIGS. 8 and 9 together illustrate the signal paths for the bus signals in a bus interface according to the present invention.
Figure 9:
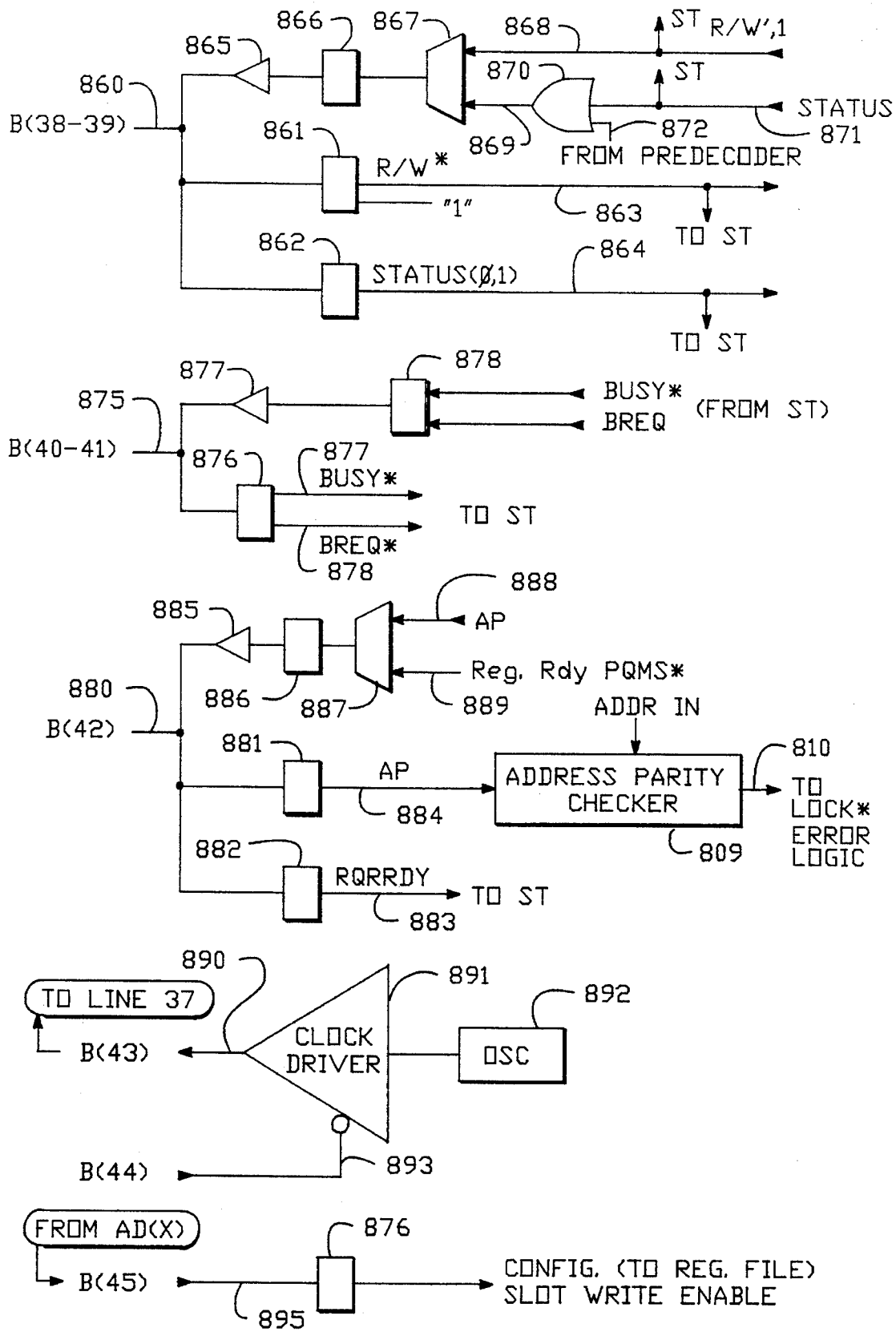
Figure 10:
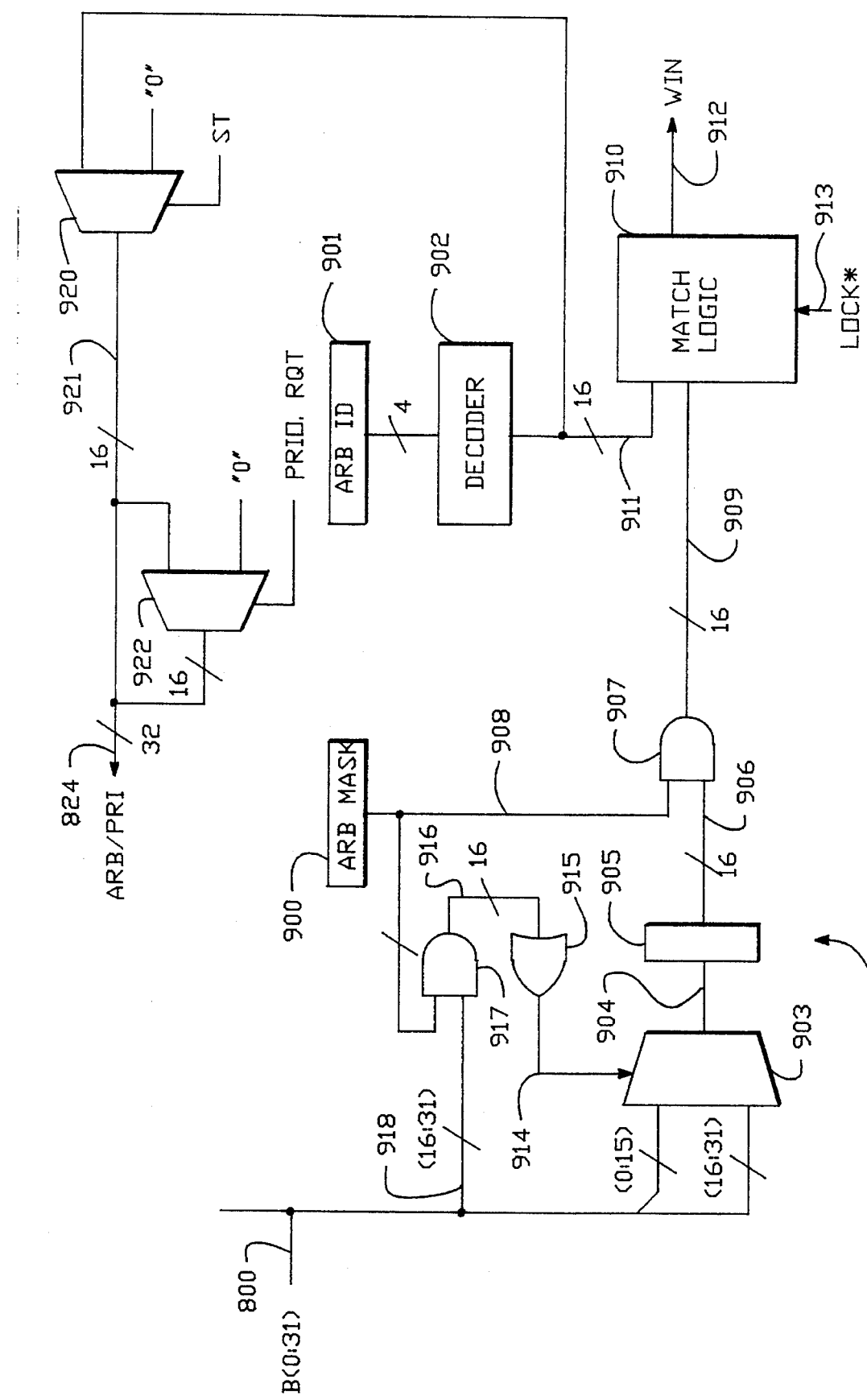
FIG. 10 is a block diagram of the arbitration win detector and arbitration and priority signal drivers for the bus interface of FIGS. 8 and 9.

FIGS. 8–10 illustrate the logical implementation of the bus interface according to the present invention, with reference to the signal definition provided above. FIGS. 8 and 9 together provide a specification for the signal paths through the interface device.

In FIG. 8, bus signals B(0:31) are supplied on line 800, bus signals B(32:35) are supplied on line 801, bus signal B(36) is supplied on line 802, and bus signal B(37) is supplied on line 803. Bus signals B(0:31), as described above, are the shared set of lines on the bus used for arbitration, address, and data phases. Thus, the incoming data on line 800 is latched at least during the address phase by latch 804, and latched during the data phase by latch 805. During arbitration phases, the data is supplied to arbitration logic 806 which is described in more detail with reference to FIG. 10. Other inputs to the arbitration logic include signals ST from the state machines. (Throughout FIGS. 8 and 9, the reference ST is used to indicate signals from the state machines or that signals are destined to the state machines, as appropriate.) The output of the arbitration logic is also supplied to the state machines. An additional input to the arbitration logic is the Lock signal on line 807.

The output of the address latch 804 is supplied on line 808 to an address parity checker 809 (see FIG. 9). The output of the address parity checker 809 is supplied on line 810 to local error logic 811. In addition, the address signals are supplied on line 808 to the address-in line for the peripheral device. The address on line 808 is supplied as input to the register file 814 as well.

The address signals are also supplied to a predecoder which performs predecoding functions to indicate address ranges as indicated above. An address valid signal is supplied on line 812 when the predecoder indicates that the address on line 808 to the peripheral is within the valid address range. Also, the predecoder asserts an address valid on line 813 to register file 814 when the address on line 808 is valid for the register file 814.

The output of the data latch is supplied on line 815 to data parity checking logic 816. In addition, the data line 815 is coupled to the register file 814 and to the peripheral device data-in path.

The register file 814 stores bus specific registers which can be read and written through the bus address and data paths. Thus, the register file includes data input from line 815 and supplies data out through a tristate bus 817. In addition, the register file 814 is coupled throughout the interface as necessary for control functions as indicated by arrow 818.

The bus lines B(0:31) are driven by tristate drivers 819. The input to tristate drivers 819 is latch 820 which is supplied by multiplexer 821. The inputs to multiplexer 821 include the address output of the peripheral device on line 822, data out of the peripheral device on line 823, data out of the register file on line 817, arbitration/priority codes on line 824 (from arbitration logic 806), and a feedback path on line 825 from the output of latch 820. The multiplexer 821 is controlled by output from the state machine to supply arbitration data from line 24 during arbitration phases, address data from line 822 or line 825 during address phases, and data from lines 823, 817, or 825 during data phases.

The tristate drivers 819 are individually controlled by driver enable logic 826. The driver enable logic is driven by information from the state machine, and by the arbitration ID register in the register file 814. As mentioned above, in a preferred system, during the arbitration phase, a signal is driven on a particular one of the lines B(0:15) for a particular arbitration code, and a particular one of the lines B(16:31) for a particular priority code. All other lines are tristated in this interface using a driver enable logic 826.

The driver enable logic 826 also controls tristating of the output drivers for other tristatable signals on the bus, although the connections are not shown explicitly in FIGS. 8 and 9.

Bus signals B(32–35) are supplied on line 801. During the arbitration phase, latch 830 samples line 32 for the Lock signals. Lock signal is supplied on line 807 to the arbitration logic 806 as mentioned above. During the address phase, latch 831 latches the BC0-2 and the memory signals and supplies the signals across line 832 to the peripheral device.

During the data phase, latch 833 latches the data parity signals DP0–DP3. The data parity signals are supplied on line 834 to data parity check logic 816. If a data parity error is detected, an error signal supplied on line 835 to local error logic 811. Other inputs to the local error logic besides the address parity error on line 810 and the data parity error on line 835 include the output from a watchdog timer 836. The watchdog timer 836 may be included for monitoring activity by the peripheral device to ensure that it remains operable using techniques known in the art. Thus, arrow 837 is included to indicate that it is connected to a suitable monitoring point which indicates activity by the peripheral device.

Bus signals B(32–35), on line 801 are driven through driver 838 from the output of latch 839. Latch 839 is supplied through multiplexer 840. The inputs to multiplexer 840 include the byte count and memory signals on line 841 from the peripheral device, the Lock signal on line 842 from the peripheral device, and the data parity signals DP0–3 on line 843 which are generated by the address and data parity generator 844.

Finally, a feedback path 845 is provided for selecting the output of latch 849 at the input of the multiplexer 840. As above, the multiplexer 840 is driven by the state machine to select the appropriate output.

The address and data parity generator 844 is coupled to the data out lines 823 and the output of register file on line 817 for generation of data parity signals DP0–DP3. In addition, the address and data parity generator 844 is coupled to the address out line 822 for generation of address parity bit.

Bus signal B(36) on line 802 is used for the Error* signal. It is latched by latch 850 during all bus phases. The error signal on the output of latch 850 is supplied on line 851 to the state machine, and to a bus error counter 852. The bus error counter indicates the number of bus clock cycles that the error signal on line 851 has asserted. This information is communicated across line 853 to the state machines. (See description of the Error* signal above.)

The Error* signal B(36) on line 802 is driven by tristate driver 854 through latch 855. The source of the Error* signal is the local error logic 811 across line 856. Thus, the signal is asserted for address or data parity errors, or a time-out of the watchdog timer 836.

Bus signal B(37) on line 803 is the bus clock and supplied to a clock buffer 857 which drives the clock throughout the interface as indicated by arrow 858.

Continuing with bus signals in FIG. 9, the bus signals B(38:39) are supplied on line 860. During the address phase, the read/write signal (R/W*) is sampled in latch 861. During the data phase, the status signals status (0, 1) are latched in latch 862. These signals are supplied on lines 863 and 864 respectively to the peripheral device and to the state machine.

These signals on line 860 are driven by tristate driver 865 with the output of latch 866. Latch 866 is supplied with information through multiplexer 867 which is controlled by the state machine. The inputs to multiplexer 867 include the read/write signal from the peripheral device on line 868, and status signals on line 869. The status signals are supplied from the output of OR logic 870. The inputs to OR logic 870 include status information from the peripheral device on line 871, and status information from the predecoder on line 872 to indicate valid status for reads to the register file.

Bus lines B(40:41) are supplied on line 875. These signals are the shared Busy* and Breq* bus signals which are latched in all phases in latch 876. These signals are coupled across lines 877 and 878 to the state machine. Similarly, these signals are driven by tristate driver 877. The tristate driver is supplied with the Busy* and Breq* signals from the state machine through latch 878.

Bus signal B(42) is supplied on line 880. During the address phase, the signal is address parity sampled in latch 881. During the data phase, the signal is latched as requestor ready by latch 882. Requestor ready signal is supplied to the state machine on line 883, the address parity signal is supplied on line 884 to the address parity checker 809. This line 880 is driven by tristate driver 885 from latch 886. Latch 886 is supplied through multiplexer 887 with address parity on line from the address and data parity generator 844 shown in FIG. 8, and from the state machine with requestor ready signal on line 889.

The bus only signals on lines 43, 44 and 45 are also shown in FIG. 9. Line B(43) provides the bus clock on line 890. The bus clock 890 is supplied by clock driver 891 which is coupled to an oscillator or other clock source 892. The clock driver 891 is enabled by the signal on line 893 which is driven by bus signal B(44). This signal is coupled to ground for the bus master device. Bus line B(43) is coupled to line B(37) on the bus and distributed throughout to provide the bus clock.

Bus line B(45) is coupled to a particular one of the lines B(0:31) as the configuration pin on line 895. This signal is latched in latch 896. Using this configuration pin, a slot number for a device coupled to the bus can be determined automatically. This signal is coupled to the register file and is addressed with a config access, as described above.

FIG. 10 illustrates the arbitration logic 806. The arbitration logic as indicated above is coupled to bus lines B(0:31) on lines 800. The register file 814 includes a register for an arbitration mask 900 and an arbitration ID 901. The arbitration ID 901 indicates a unique 1 of 16 lines for the arbitration signal for the local device. Thus, a 4 bit arbitration ID may be stored in register 901 and decoded by decoder 902 to generate a 16 bit code with a single bit set. The arbitration mask 900 is loaded by a bus monitoring node to indicate which lines on the bus have active modules coupled to them.

Thus, incoming signals on line 800 are supplied to multiplexer 903. The low order bits (0:15) or the high order bits (16:31) are selected for output on line 904 to latch 905. The output of latch 905 is a 16 bit sample from the bus. This sample on line 906 is supplied through mask logic 907. The mask logic 907 operates to provide a bit wise AND of the signal on line 906 with the arbitration mask value supplied on line 908 from the arbitration mask 900. The output of the mask logic 907 is supplied on line 909 to match logic 910. The match logic 910 is also coupled to the output of the decoder 902 across line 911. If the local arbitration ID as indicated on 911 matches the mask code on line 911, then an arbitration "win" signal is asserted on line 912, unless the Lock signal has been asserted as indicated on line 913.

Multiplexer 903 operates to select either the low order bits for normal arbitration, or the high order bits for priority arbitration in response to the signal on line 914. The signal on line 914 is driven by the output of OR gate 915. The input to OR gate 915 includes 16 bits of mask priority code on line 916. The mask priority code is driven by mask logic 917 which receives as input the arbitration mask on line 908 and the high order bits of the bus (16:31) on line 918. Thus, the high order bits are selected if any one of the priority signals is asserted and unmasked. In this manner any module on the bus which drives a priority code will override the normal arbitration function in the distributed arbitration logic.

The arbitration and priority information on line 824 of FIG. 8, is also supplied by the arbitration logic 806 of FIG. 10. This information is supplied to the multiplexer 821 shown in FIG. 8 for driving bus lines B(0:31). The arbitration code is supplied on line 911 from the output of decoder 902. The output of decoder 902 on line 911 is supplied to multiplexer 920. The second input to multiplexer 920 is all zeros. During an arbitration phase when the local device desires access to the bus, the local arbitration code is selected through multiplexer 920 to line 921. Otherwise, all zeros are supplied on line 921.

The 16 bits on line 921 are also supplied to multiplexer 922. The second input to multiplexer 922 is all zeros. Multiplexer 922 supplies the high order bits to the arbitration and priority signal on line 824. Multiplexer 922 is controlled by the priority request signal from the state machine as described above. Thus, when the state machine indicates that the local module desires to arbitrate for the bus, the local arbitration code is supplied on line 921. In normal operation, the low order bits of the bus are thus driven with the local arbitration code on the low order bits, and all zeros on the high order bits. If a priority request is indicated, then multiplexer 922 selects the local arbitration code to the high order bits as well. The tristate driver enable logic 826 tristates all lines (0–31) on the bus except for the particular lines allocated to the local module for arbitration and priority.

V. State Diagrams—FIGS. 11–15

Overview

This section is intended to clarify the algorithms and implementations of state machines used on the bus. The following conventions are followed in the state diagrams shown in FIGS. 11–15: The states that an agent may assume are represented by circles. The transitions are indicated as arrows. Those transitions which occur on a positive edge of the clock flow into a state with a name suffixed with a "+", while those transitions which occur on a negative edge of the clock flow in to a state with a name suffixed with a "–". The initial transition from the clear condition overrides all other conditions and transitions. If none of the conditions required for a transition from a state are met, then the agent will remain in that state. Ordinarily, conditions causing an agent to remain in the same state are not shown.

An H when used with a signal name indicates assertion, L indicates negation. A* is suffixed to signal names which are active low. For example, Breq*=L indicates that there is a bus request, as would Breq=H if the signal were active high. Signals which come from the bus are prefixed by b_ for example, b_breq*.

The following terminology is used in this document: On the bus a clock is one clock period long. A slot is the portion of the bus used by one agent to perform its complete transfer. A cycle is a group of one or more slots formed by several agents entering a bus request at the same time. The arbitration which is with another transfer is the inter-arbitration.

A. State Flow Diagram for an Agent Monitoring the Bus—FIGS. 11 and 12

Figure 11:
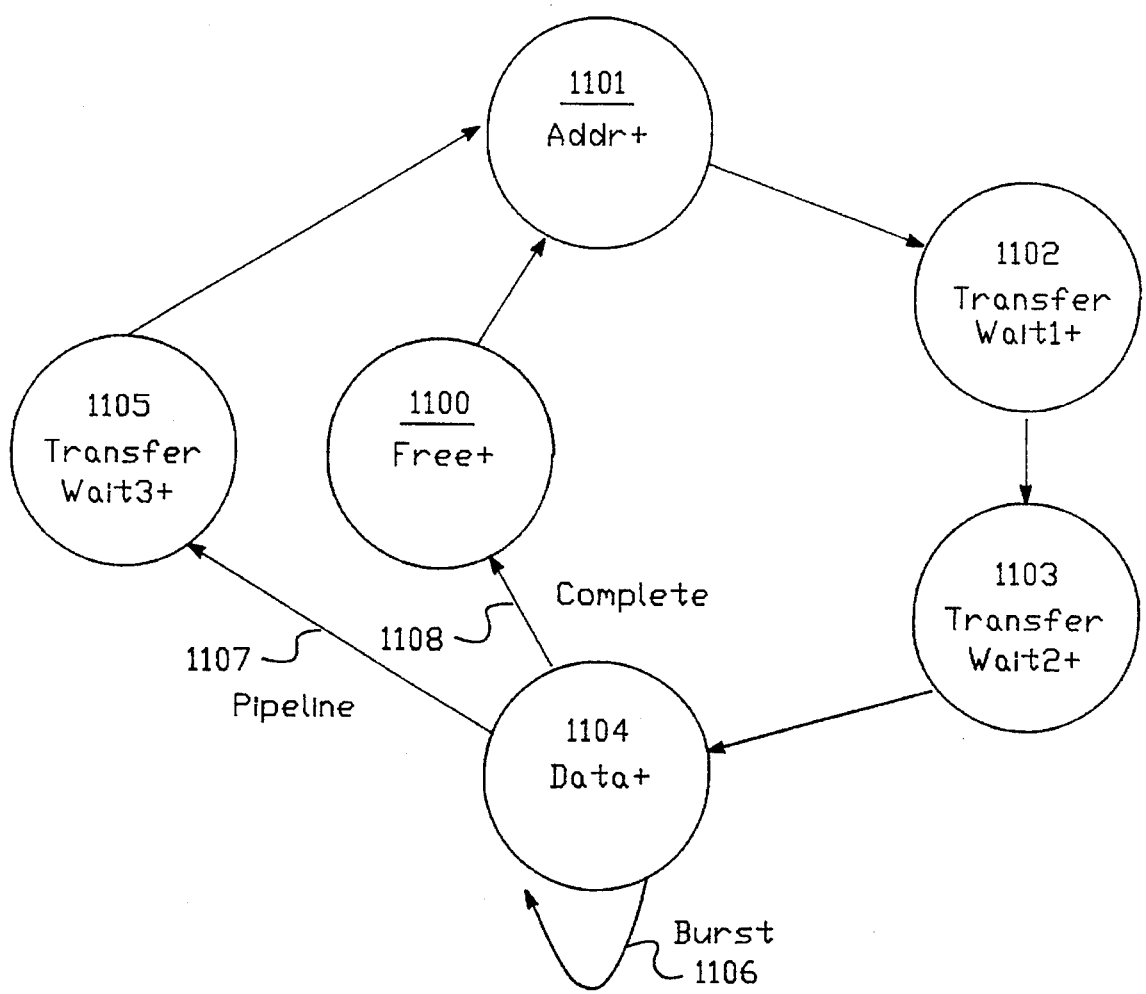
FIG. 11 is a state diagram for an agent on the bus monitoring transfer phases according to the present invention.
Figure 12:
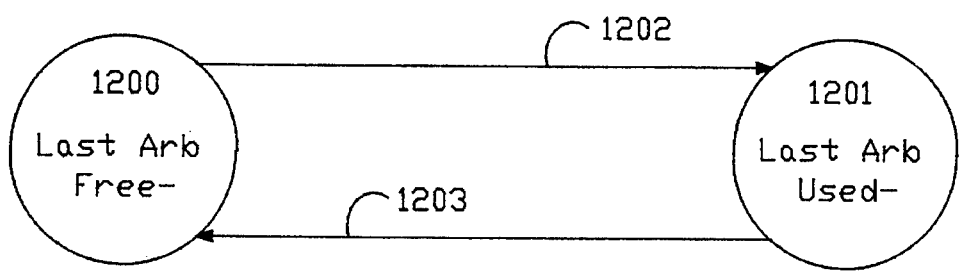
FIG. 12 is a state diagram for monitoring the bus request and lock signals for the arbitration logic according to the present invention.
Figure 13:
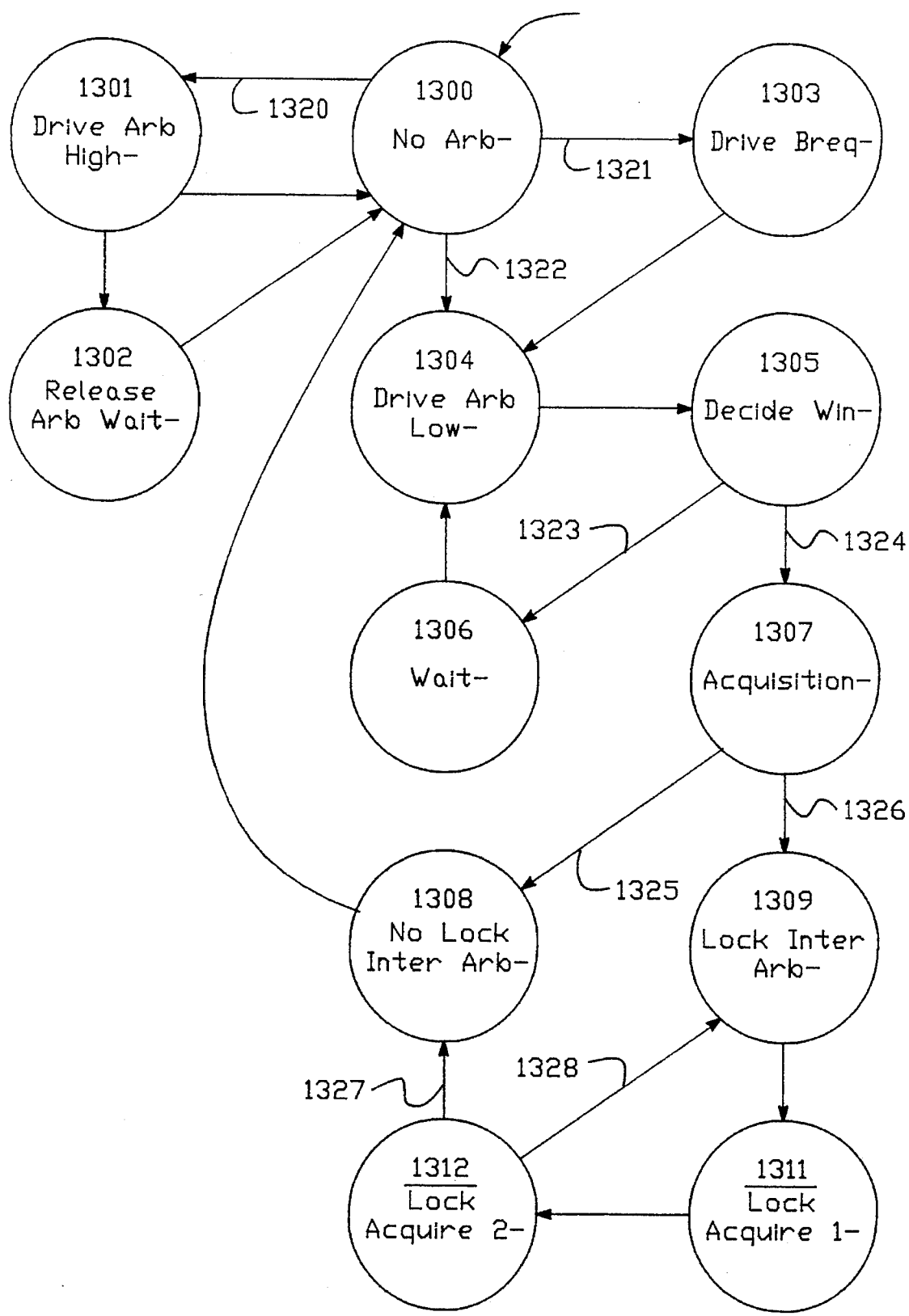
FIG. 13 is a state diagram for arbitration and locking according to the present invention.

FIGS. 11 and 12 represent the states for an agent monitoring the bus. All agents must continually monitor the bus in order to maintain synchronization with the bus state.

Conditions used for transitions from the Data+ state 1104 include the following:

| | |
|---|---|
| Burst | (b_bsy*=L AND b_Status=ready AND b_Requestor Ready) |
| Pipeline | b_Status=read AND b_Requestor Ready AND b_bsy*=H AND Last Arb Used+ state OR b_Status=Backoff OR b_Status=NobodyHome OR Lock Acquire 2– state |
| Complete | b_Status=ready AND Requestor Ready AND b_bsy*=H AND Last Arb Free– state OR b_Status = NobodyHome OR b_Status=Backoff |

States:
Free+ 1100

| | |
|---|---|
| Description: | This state corresponds to a free bus |
| Outputs: | None; all agents are monitoring the bus. |
| Transitions: | All agents move to the Addr+ state 1101 when (Decide Win– state 1305 OR Release Arb Wait– state 1302) (see FIG. 13) on the rising edge of the clock. |

Addr+ 1101

| | |
|---|---|
| Description: | Address information is being placed onto the bus during this state. |
| Outputs: | none |
| Transitions: | Transfers to Transfer Wait1+ state 1102 on the next rising clock edge when b_Bsy*=L. |

TransferWait1+ 1102

| | |
|---|---|
| Description: | Dummy state for timing purposes |
| Outputs: | None |
| Transitions: | Always transfers to Transfer Wait2+ state 1103 on the next rising clock edge. |

TransferWait2+ 1103

| | |
|---|---|
| Description: | Dummy state for timing purposes. |
| Outputs: | none |
| Transitions: | Always transfers to Data+ state 1104 on the next rising clock edge. |

Data+ 1104

| | |
|---|---|
| Description: | One or more clocks of data transfer are occurring. |
| Outputs: | none |
| Transitions: | Transfers across transition 1107 to the Transfer Wait3+ state 1105 if Pipeline is true, corresponding to multiple agents having entered the initial arbitration phase at the same time. Transfers across transition 1108 to Free+ state if this is the last data transfer of the last agent to acquire the bus (Complete is true). Transfers across transition 1106 to the Data+ state 1104 if Burst, corresponding to a single transfer completed within an uncompleted burst transfer. |

Transfer Wait3+ 1105

| | |
|---|---|
| Description: | Dummy state for timing purposes. |
| Outputs: | None. |
| Transitions: | Always transfers to address+ state 1101 on the next rising clock edge. |

FIG. 12 illustrates a state machine used for monitoring arbitration activity having two states 1200 and 1201.

Last Arb Free–
1200

| | |
|---|---|
| Description | Stores information about whether the last arbitration slot was used, in order to determine if the bus moves into a free state or a subsequent transfer after this transfer is completed. |
| Outputs: | none |
| Transitions: | Moves across transition 1202 into the Last Arb Used– state 1201 on the falling edge of the clock if (Drive Arb High– state 1301 OR No Lock InterArb– state 1308) AND b Breq*=L |

Last Arb Used–
1201

| | |
|---|---|
| Description: | Stores information about use of the last |

|  |  |
|---|---|
| Outputs:<br>Transitions: | arbitration slot<br>none<br>Transfers across transition 1203 to the Last Arb Free– state 1200 on the falling edge of the clock if (Drive Arb High– state 1301 OR No Lock InterArb– state 1308) AND b_Breq*=H. |

B. State Flow Diagram for Arbitration and Locking—FIG. 13

Conditions for transitions set out below include signals from the peripheral device including:

| | |
|---|---|
| Transfer Done | Indicates to the bus state machine that the local agent has completed the last data transfer and is ready to relinquish the bus. |
| Bus Wanted | Indicates to the bus state machine that the agent has a pending bus operation and would like to use the bus. |
| Win | True if the "highest" arbitration ID on the bus is identical to the arbitration ID of the agent. |
| Backoff Wait | True if the counter which is triggered by a backoff status has yet counted down the required number of cycles. |
| Priority Request | Indicates to the bus state machine that the agent requests a priority transfer. |

States:

No Arb– 1300

| | |
|---|---|
| Description: | This is "Idle" state for the arbitrating agent. No use of the bus is occurring by this agent. |
| Outputs: | none. |
| Transitions: | Transfers on line 1320 to the Drive Arb High– state 1301 on the next negative clock edge when Free+ state 1100 AND b_Breq* =L OR Transfer Wait1+ state 1102 AND (NOT Bus Wanted OR Breq*=L) OR BackoffWait.<br>Transfers on line 1321 to the Drive Breq– state 1303 on the next negative clock edge when Bus Wanted AND Free+ state 1100 AND NOT Backoff Wait<br>Transfers on line 1322 to the Drive Arb Low– state 1304 on the next negative clock edge when Transfer Wait1+ state 1102 AND Bus Wanted AND NOT BackoffWait AND (b_Breq*=H OR Priority Request) |

Drive Arb High– 1301

| | |
|---|---|
| Description: | The agent is driving its arbitration bit high during an arbitration cycle when it does not desire use of the bus. |
| Outputs: | The arbitration bit assigned this agent is driven high (H). |
| Transitions: | Always transfers on line to the Release Arb Wait– state 1302 on the next negative clock edge. |

Release Arb Wait– 1302

| | |
|---|---|
| Description: | The agent is holding for one clock after driving the arbitration line, before returning to the NoArb– state 1300. |
| Outputs: | None. |
| Transitions: | Always transfers to the No Arb– state 1300 on the next negative clock edge. |

Drive Breq– 1303

| | |
|---|---|
| Description: | The agent is driving b_breq* in preparation for actively arbitrating for the bus from a free bus condition. |
| Outputs:<br>Transitions: | b_breq* is driven low (L).<br>Always transfers to the Drive Arb Low– state 1304 on the next negative clock edge. |

Drive Arb Low– 1304

| | |
|---|---|
| Description: | The agent is actively arbitrating for the bus. |
| Outputs: | One of the b_Arbitration Codes (0–15) is driven low, and one of the b_Priority (15–31) is also driven low, if applicable. b_breq*=L, is also being driven in this state. |
| Transitions: | Always transfers to the Decide Win– state 1305 on next negative clock edge. |

Decide Win– 1305

| | |
|---|---|
| Description: | This state allows the agent time to calculate the results of arbitration. |
| Outputs: | b_Breq*=L |
| Transitions: | Transfers on line 1323 to the Wait– state 1306 on the next negative clock edge if b_Lock=L or NOT Win.<br>Transfers on line 1324 to the Acquisition– state 1307 on the next negative clock edge if Win AND b_Lock=H. |

Wait– 1306

| | |
|---|---|
| Description: | The agent has lost in arbitration and must wait for the next available arbitration slot to re– arbitrate. |
| Outputs: | b_breq* is driven low (L) by the agent. |
| Transitions: | Transfers to the Drive Arb Low– state 1304 on the next negative clock edge if Transfer Wait1+ state 1102. |

Acquisition– 1307

| | |
|---|---|
| Description: | The agent has won the arbitration process and has acquired the bus. |
| Outputs: | none |
| Transitions: | Transfers on line 1325 to the No Lock InterArb– state 1308 on the next negative clock edge if NOT Lock AND Transfer Wait1+ state 1102.<br>Transfers on line 1326 to the Lock InterArb– state 1309 on the next negative clock edge if Lock AND Transfer Wait1+ state 1102. |

No Lock InterArb– 1308

| | |
|---|---|
| Description: | During the state the agent is driving its arbitration bit high, while still maintaining ownership of the bus. |
| Outputs: | The arbitration bit assigned to this agent is driven high (H). The b_Lock bit is driven Low (L). |
| Transitions: | Always transfers to the No Arb– state 1300 on the next falling clock edge. |

Lock InterArb– 1309

| | |
|---|---|
| Description: | The agent has acquired the bus for the purposes of a lock transfer and the current transfer is to be locked to the next transfer. |
| Outputs: | The Agent drives the b_Lock signal high (H) during the inter-arbitration period. b_Breq*=L. |
| Transitions: | Always transfers to the Lock Acquire1– state 1311 on the next negative clock edge. |

Lock Acquire1– 1311

| | |
|---|---|
| Description: | The agent has ownership of the bus and has at least one more slot left in a group of locked slots. |
| Outputs: | b_Breq*=L |
| Transitions: | Transfers on line to the Lock Acquire2– state when Transfer Done is true on the negative clock edge. |

Lock Acquire 2– 1312

| | |
|---|---|
| Description: | The agent is completing a transfer other than the first transfer in a group of locked transfers. The agent may either continue the locked transfer or terminate. |
| Outputs: | b_Breq*=L |
| Transitions: | Transfers on line 1327 to the No Lock InterArb– state 1308 if Transfer Wait1+ state 1102 AND NOT Lock. |
| | Transfers on line 1328 to the Lock InterArb– state 1309 if Transfer Wait1+ state 1102 AND Lock. |

C. State Flow Diagram for a Requesting Agent on the Bus—FIG. 14

Figure 14:
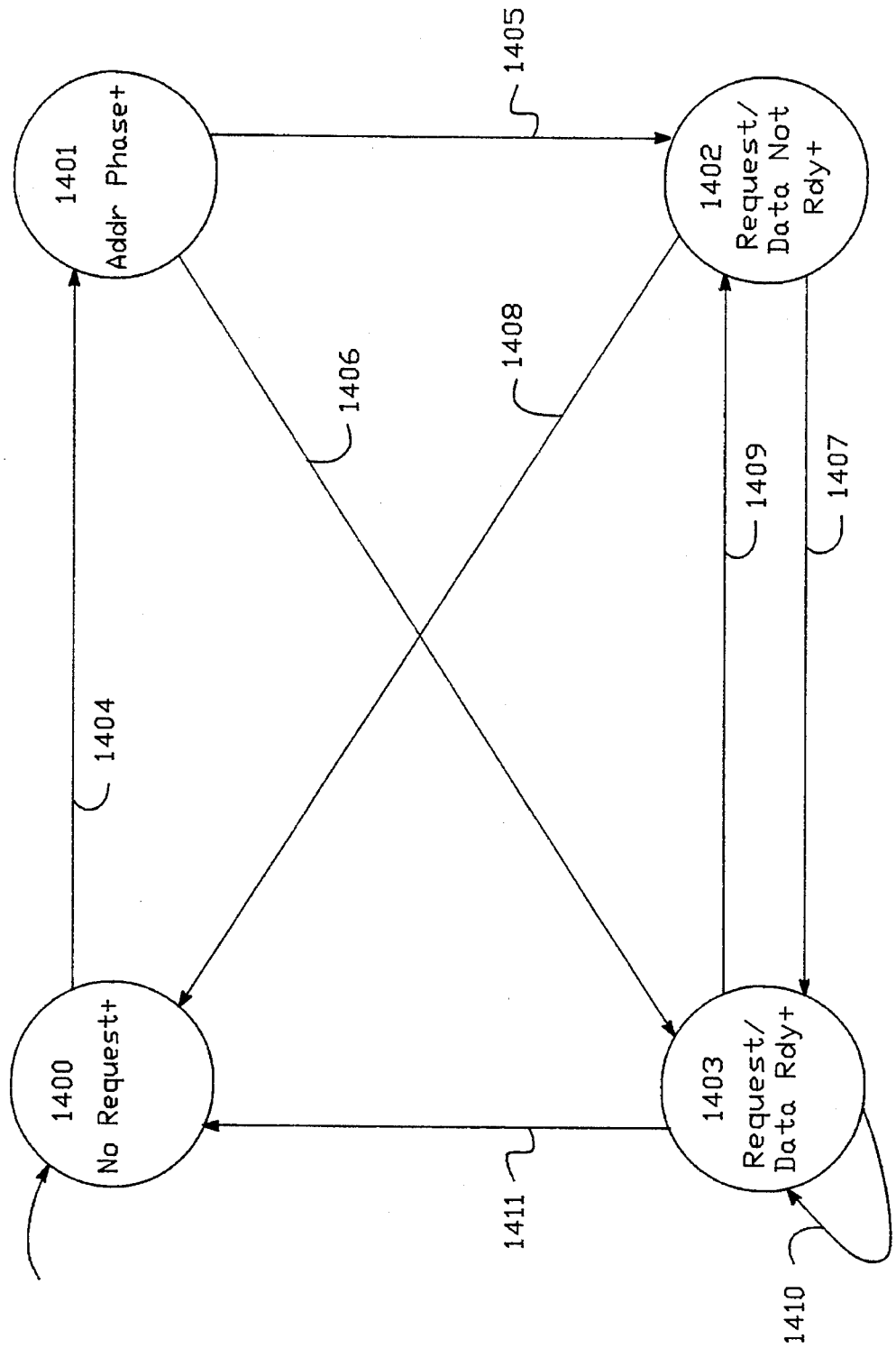
FIG. 14 is a state diagram for an agent requesting transfer for the bus of the present invention.

Conditions used in the transitions of FIG. 14 include:

| | |
|---|---|
| Request Ready | Indicates the requesting agent is ready to complete a data transfer. |
| Transfer Done | Indicates that the agent has completed all desired data transfers and wishes to relinquish the bus. |

States:
No Request+ 1400

| | |
|---|---|
| Description: | This is the "idle" state for an agent which is not actively using the bus. |
| Outputs: | none. |
| Transitions: | Transfers on line 1404 to the Addr Phase+ state 1401 if Decide Win– state 1305 AND NOT b_Lock=H AND Win AND Free+ state 1100 OR (Acquisition– state 1307 OR Lock Acquire2– state 1312) AND Transfer Wait3+ state 1105. |

Addr Phase+ 1401

| | |
|---|---|
| Description: | In this state the agent has acquired the bus and is driving address information onto the bus. |
| Outputs: | b_A0–A31, b_Memory/IO*, b_Byte Count, b_Read/Write* |
| Transitions: | Transfers on line 1405 to the Requestor Data Not Rdy+ state 1402 if NOT Request ready and Transfer Wait2+ state 1103. |
| | Transfers on line 1406 to the Requestor Data Rdy+ state 1403 if Request ready and Transfer Wait2+ state 1103. |

Requestor Data Not Rdy+ 1402

| | |
|---|---|
| Description: | The Requestor has completed the address phase but is not ready to complete the data portion of a transfer. |
| Outputs: | b_Requestor Ready is low (L). |
| Transitions: | Transfers on line 1407 to the Requestor Data Rdy+ state 1403 if Requestor Ready AND NOT (b-Status=NobodyHome OR b_Status=Backoff) |
| | Transfers on line 1408 to the No Request+ state 1400 if b_Status=NobodyHome OR b-Status=Backoff. |

Requestor Data Rdy+ 1403

| | |
|---|---|
| Description: | The Requestor has completed the address is phase and is ready to complete the data phase of a transfer. |
| Outputs: | Requestor Ready is asserted (H) and valid data and parity are driven onto the bus if this is a write operation. |
| Transitions: | Transfers on line 1409 to the Requestor Data Not Rdy+ state 1402 if b_status=ready AND NOT (Requestor Ready OR Transfer Done OR b_Status=Backoff OR b_Status=NobodyHome) on the positive edge of the clock. This corresponds to a transfer of one datum with the requestor not being ready to drive data for a consecutive Datum. |
| | Transfers on line 1410 to the same state 1403 if b_status=ready AND Requestor Ready AND NOT (Transfer Done OR b_Status=Backoff OR b_Status=NobodyHome) on the positive edge |

|   |   |
|---|---|
|   | of the clock. This corresponds to a transfer of one datum with the requestor immediately ready to supply the next datum. Transfers on line 1411 t the No Request+ state 1406 if b_Status=ready AND Transfer Done OR (b_Status=NobodyHome OR b_Status=Backoff) on the positive edge of the clock. The agent has completed transfer of the final datum and is relinquishing the bus. |

D. State Flow for Replying Agent on the Bus—FIG. 15.

Note that in some cases an agent may wish to assert b_status=retry in order to avoid bus deadlock.

Figure 15:
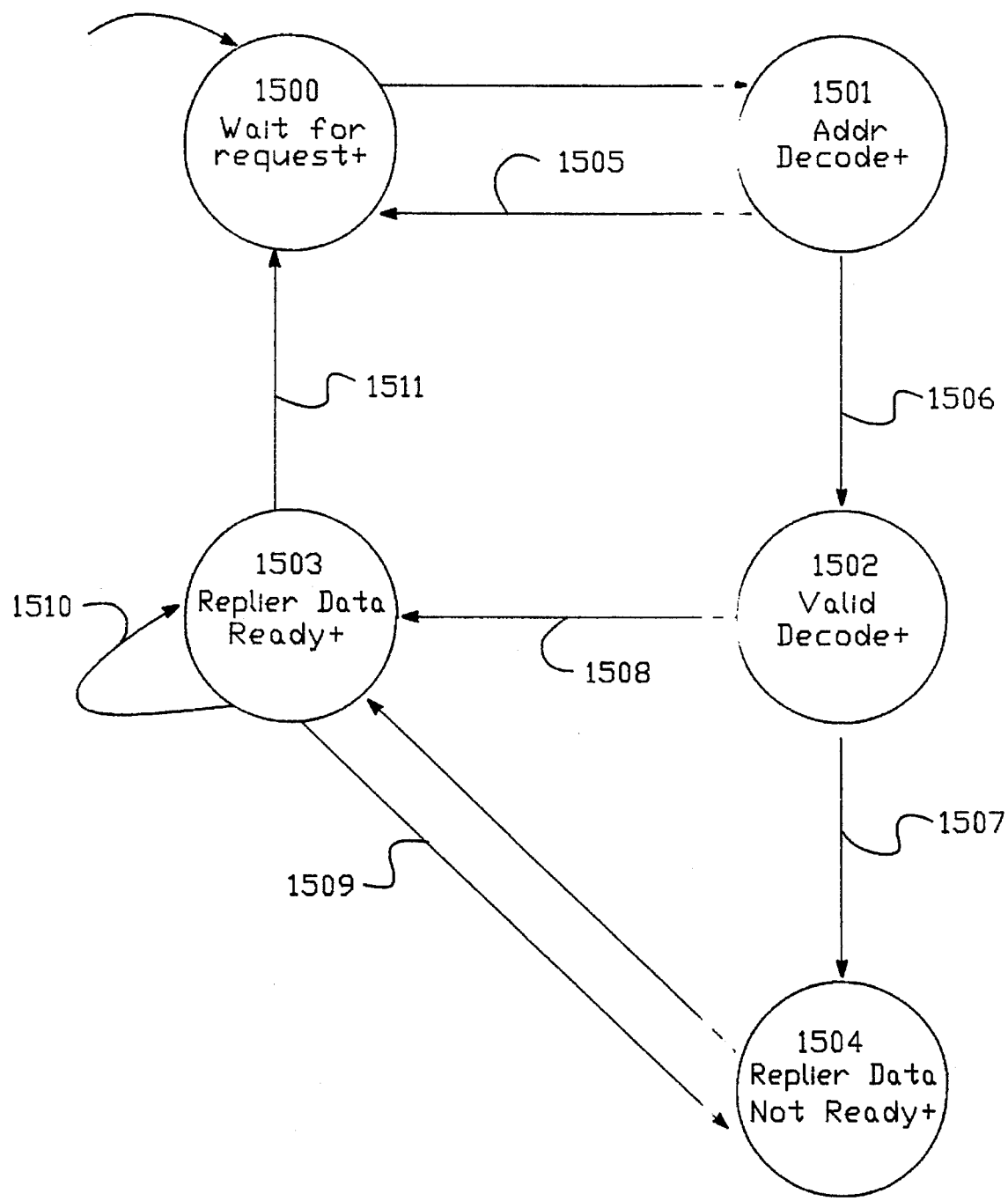
FIG. 15 is a state diagram for a replier on the bus of the present invention.

Conditions involved in the transitions of FIG. 15 include:

|   |   |
|---|---|
| Match | Address on the bus matches an address or range of addresses which this agent responds to. |
| Replier Ready | Indicates this agent is ready, as the replier, to accept or send data. |
| States: | |
| Wait for request+ 1500 | |
| Description: | This state is the "idle" state for an agent acting as a replier. |
| Outputs: | none |
| Transitions: | Transfers to the Addr Decode+ state 1501 if Addr+ state 1101 on the positive edge. |
| Addr Decode+ 1501 | |
| Description: | In this state, the address received on the bus is decoded in the predecoder to determine whether it is within a valid address range. |
| Outputs: | None. |
| Transitions: | Transfers on line 1505 to the wait for Request+ state 1500 in the event it is an invalid address. Transfers on line 1506 to the valid decode+ state 1502 if an address match is detected. |
| Valid Decode+ 1502 | |
| Description: | This is a dummy state for timing purposes. |
| Outputs: | none |
| Transitions: | Transfers on line 1507 to Replier Data Not Ready+ state 1504 on the next positive clock edge if NOT Replier ready. This is the case of a valid decode and a replier not immediately ready with data. Transfers on line 1508 to Replier Data Ready+ state 1503 on the next positive clock edge if Replier ready. This is the case of a valid decode and a replier immediately ready with data. |
| Replier Data Ready+ 1503 | |
| Description: | This state indicates a selected replier with ready data. |
| Outputs: | b_status=ready, valid data and parity if a read transfer. |
| Transitions: | Transfers on line 1509 to the Replier Data Not Ready* state 1504 if NOT Replier Ready AND b_Requestor Rdy=H AND b_bsy*=L. This corresponds to a complete transfer of one datum with the replier not ready to transfer another datum immediately. Stays as indicated by line 1510 in the Replier Data Ready+ state 1503 if Replier Ready AND b_Requestor Ready=H and b_bsy*=L on the next rising clock edge. This |

| | -continued |
|---|---|
| | corresponds to a completed transfer of one data item with the replier immediately ready to transfer the second item. Transfers on line 1511 to the Wait for Request+ state 1500 if b_bsy*=H AND b_Requestor Ready=H. This corresponds to a completed cycle. |
| Replier Data Not Ready+ 1504 | |
| Description: | This state is for an agent which has detected a valid address decode but is not immediately ready to supply or accept data. |
| Outputs: | b_status=hold |
| Transitions: | Transfers to the Replier Data Ready+ state 1503 if Replier Ready is asserted on the positive transition of the clock. This corresponds to a selected agent which was previous not ready to reply becoming ready. |

VI. Conclusion

Accordingly, the present invention provides a high speed, high throughput bus optimized for internetworking applications which can be used in a wide variety of other data processing environments. The bus provides very little latency, and low pin count interfaces for both high performance and low cost. It features shared arbitration, address, data lines, distributed arbitration logic which detects arbitration wins in a single cycle, and optimizations for true burst mode transfers. Furthermore, the arbitration scheme is flexible and robust.

The foregoing description of preferred embodiments of the present invention has been provided for the purposes of illustration and description. It is not intended to be exhaustive or to limit the invention to the precise forms disclosed. Obviously, many modifications and variations will be apparent to practitioners skilled in this art. The embodiments were chosen and described in order to best explain the principles of the invention and its practical application, thereby enabling others skilled in the art to understand the invention for various embodiments and with various modifications as are suited to the particular use contemplated. It is intended that the scope of the invention be defined by the following claims and their equivalents.

What is claimed is:

1. A bus interface for connection of a local data processing module to a tri-state bus, comprising:

control means, coupled to the bus and the local data processing module, for detecting bus phases;

arbitration logic, coupled to a set of arbitration lines of the bus and responsive to the control means, including means for supplying a local arbitration code to a first designated subset of the set of arbitration lines and tri-stating other lines in the set of arbitration lines in a particular bus phase, means for supplying a local priority code to a second designated subset of the set of arbitration lines in the particular bus phase, and means, responsive to the local arbitration code and to other arbitration codes on the set of arbitration lines, and responsive to the local priority code and other priority codes on the set of arbitration lines, for detecting an arbitration win during the particular bus phase;

address means, coupled to a set of address lines of the bus and to the local data processing module, responsive to the control means for selectively supplying addresses to, and sampling addresses on the set of address lines in bus phases;

data means, coupled to a set of data lines of the bus and to the local data processing module, responsive to the control means for selectively supplying data to, and sampling data on the set of data lines in bus phases.

2. The bus interface of claim 1, wherein the control means detects arbitration phases, address phases and data phases, and the arbitration logic is responsive to arbitration phases, the address means is responsive to address phases and the data means is responsive to data phases.

3. The bus interface of claim 2, wherein the address phases and data phases are non-overlapping in time, and the set of address lines is a subset of the set of data lines.

4. The bus interface of claim 2, wherein the arbitration phases and the address phases are non-overlapping in time, and the set of arbitration lines is a subset of the set of address lines.

5. The bus interface of claim 2, wherein the arbitration phases, the address phases and the data phases are non-overlapping in time, and the set of arbitration lines is a subset of the set of address lines, and the set of address lines is a subset of the set of data lines.

6. The bus interface of claim 2, wherein the arbitration phases, the address phases and the data phases are non-overlapping in time, the set of arbitration lines and the set of address lines are respective subsets of the set of data lines.

7. The bus interface of claim 2, wherein arbitration phases begin and end on negative clock edges and address and data phases begin and end on positive clock edges.

8. The bus interface of claim 2, wherein arbitration phases begin and end on positive clock edges and address and data phases begin and end on negative clock edges.

9. The bus interface of claim 1, further including a register, accessible through the address means and the data means, which stores an arbitration identifier indicating the first designated subset of the arbitration lines for the local arbitration signal.

10. The bus interface of claim 1, further including an arbitration mask register, coupled to the means for detecting an arbitration win, and accessible through the address means and the data means, which stores an arbitration mask indicating subsets of the arbitration lines designated for other data processing modules on the bus.

11. A bus interface for connection of a local data processing module to a tri-state bus, comprising:

control means, coupled to the bus and the local data processing module, for detecting arbitration phases, address phases and data phases for transfers on the bus;

arbitration logic, coupled to a set of arbitration lines of the bus and responsive to the control means, which arbitrates for transfers during arbitration phases, including means for supplying a local arbitration code to a first designated subset of the set of arbitration lines and tri-stating the other lines in the set of arbitration lines, in a particular arbitration phase for a particular transfer, and means, responsive to the local arbitration code and to other arbitration codes on the set of arbitration lines, for detecting an arbitration win for the particular transfer;

address means, coupled to a set of address lines of the bus and to the local data processing module, responsive to the control means for selectively supplying addresses to, and sampling addresses on the set of address lines in address phases;

data means, coupled to a set of data lines of the bus and to the local data processing module, responsive to the control means for selectively supplying data to, and sampling data on the set of data lines in data phases;

wherein the arbitration phases, the address phases and the data phases are non-overlapping in time, and the set of arbitration lines is a subset of the set of address lines, and the set of address lines, is a subset of the set of data lines.

12. The bus interface of claim 11, wherein the means for detecting an arbitration win for the particular transfer generates a signal indicating arbitration win or lose during the particular arbitration phase.

13. The bus interface of claim 11, wherein the arbitration logic further includes:

bus request means, coupled to a bus request line on the bus, the means for detecting an arbitration win and the local data processing module, responsive to the control means for sampling bus request signals on the bus request line during bus phases, and supplying a bus request signal on the bus request line during a particular bus phase if the local data processing module signals a need for the bus and there was no previously asserted bus request signal on the bus from another module on the bus, or if a bus request signal was supplied by the bus request means during a preceding arbitration phase, the local data processing module continues to signal a need for the bus and an arbitration win is not detected, so that a multi-phase bus cycle is entered to serve a group of modules on the bus which assert the bus request signal during the particular bus phase.

14. The bus interface of claim 13, wherein the arbitration phases include initial arbitration phases between transfers and inter-arbitration phases between address and data phases within transfers, and the arbitration logic includes:

lock means, coupled to a lock line on the bus, the means for detecting an arbitration win and the local data processing module, responsive to the control means for selectively sampling the lock line if an arbitration win was not detected in a preceding arbitration phase, and driving the lock line during an inter-arbitration phase if the local data processing module continues to signal a need for the bus and an arbitration win was detected in the preceding arbitration phase; and means, coupled to the lock line of the bus, responsive to an asserted lock signal on the bus for disabling arbitration by the local data processing module for the bus during the inter-arbitration phase.

15. The bus interface of claim 11, wherein the arbitration phases include initial arbitration phases between transfers and inter-arbitration phases between address and data phases within transfers, and the arbitration logic further includes:

lock means, coupled to a lock line on the bus, the means for detecting an arbitration win and the local data processing module, responsive to the control means for selectively sampling the lock line if an arbitration win was not detected in a preceding arbitration phase, and driving the lock line during an inter-arbitration phase if the local data processing module continues to signal a need for the bus and an arbitration win was detected in the preceding arbitration phase; and means, coupled to the lock line of the bus, responsive to an asserted lock signal on the bus for disabling arbitration by the local data processing module for the bus during the inter-arbitration phase.

16. The bus interface of claim 11, wherein the arbitration means includes means for supplying a local priority code to a second designated subset of the set of arbitration lines in the particular arbitration phase, and the means for detecting an arbitration win is further responsive to the local priority code and other priority codes on the set of arbitration lines.

17. The bus interface of claim 11, further including a register, accessible through the address means and the data means, which stores an arbitration identifier indicating the first designated subset of the arbitration lines for the local arbitration signal.

18. The bus interface of claim 17, further including an arbitration mask register, coupled to the means for detecting an arbitration win, and accessible through the address means and the data means, which stores an arbitration mask indicating subsets of the arbitration lines connected to other data processing modules on the bus.

19. The bus interface of claim 11, wherein arbitration phases begin and end on negative clock edges and address and data phases begin and end on positive clock edges.

20. The bus interface of claim 11, wherein arbitration phases begin and end on positive clock edges and address and data phases begin and end on negative clock edges.

21. A bus interface for connection of a local data processing module to a bus, comprising:

control means, coupled to the bus and the local data processing module, for detecting arbitration phases, address phases and data phases for transfers on the bus;

arbitration logic, coupled to a set of arbitration lines of the bus and responsive to the control means, which arbitrates for transfers during arbitration phases, including means for supplying a local arbitration code to a first designated subset of the set of arbitration lines in a particular arbitration phase for a particular transfer, means for supplying a local priority code to a second designated subset of the set of arbitration lines in the particular arbitration phase, and means, responsive to the local arbitration code and the local priority code, and to other arbitration codes and priority codes on the set of arbitration lines, for detecting an arbitration win for the particular transfer during the particular arbitration phase;

address means, coupled to a set of address lines of the bus and to the local data processing module, responsive to the control means for selectively supplying addresses to, and sampling addresses on the set of address lines in address phases;

data means, coupled to a set of data lines of the bus and to the local data processing module, responsive to the control means for selectively supplying data to, and sampling data on the set of data lines in data phases; and bus request means, coupled to a bus request line on the bus, the means for detecting an arbitration win and the local data processing module, responsive to the control means for sampling bus request signals on the bus request line during bus phases, and supplying a bus request signal on the bus request line during a particular bus phase if the local data processing module signals a need for the bus and there was no previously asserted bus request signal on the bus from another module on the bus, or if a bus request signal was supplied by the bus request means during a preceding arbitration phase, the local data processing module continues to signal a need for the bus and an arbitration win is not detected, so that a multi-phase bus cycle is entered to serve a group of modules on the bus which assert the bus request signal during the particular bus phase;

wherein the arbitration phases, the address phases and the data phases are non-overlapping in time, and the set of arbitration lines is a subset of the set of address lines, and the set of address lines is a subset of the set of data lines.

22. The bus interface of claim 21, wherein the arbitration phases include initial arbitration phases between transfers and inter-arbitration phases between address and data phases within transfers and the arbitration logic includes:

lock means, coupled to a lock line on the bus, the means for detecting an arbitration win and the local data processing module, responsive to the control means for selectively sampling the lock line if an arbitration win was not detected in a preceding arbitration phase, and driving the lock line during an inter-arbitration phase if the local data processing module continues to signal a need for the bus and an arbitration win was detected in the preceding arbitration phase; and means, coupled to the lock line of the bus, responsive to an asserted lock signal on the bus for disabling arbitration by the local data processing module for the bus during the inter-arbitration phase.

23. The bus interface of claim 21, further including a register, accessible through the address means and the data means, which stores an arbitration identifier indicating the subset of the arbitration lines for the local arbitration signal.

24. The bus interface of claim 23, further including an arbitration mask register, coupled to the means for detecting an arbitration win, and accessible through the address means and the data means, which stores an arbitration mask indicating subsets of the arbitration lines connected to other data processing modules on the bus.

25. The bus interface of claim 21, wherein the set of data lines have a high-impedance state and the arbitration logic includes means for driving data lines in the set of arbitration lines other than the first and second designated subsets to the high impedance state.

* * * * *